United States Patent
Kimura et al.

[19]

[11] Patent Number: 6,105,127
[45] Date of Patent: Aug. 15, 2000

[54] MULTITHREADED PROCESSOR FOR PROCESSING MULTIPLE INSTRUCTION STREAMS INDEPENDENTLY OF EACH OTHER BY FLEXIBLY CONTROLLING THROUGHPUT IN EACH INSTRUCTION STREAM

[75] Inventors: Kozo Kimura; Tokuzo Kiyohara, both of Osaka; Kousuke Yoshioka, Neyagawa, all of Japan

[73] Assignee: Matsushita Electric Industrial Co., Ltd., Osaka, Japan

[21] Appl. No.: 08/920,135

[22] Filed: Aug. 27, 1997

[30] Foreign Application Priority Data

Aug. 27, 1996 [JP] Japan .................................. 8-224720

[51] Int. Cl.$^7$ ........................................................ G06F 9/38
[52] U.S. Cl. ..................... 712/215; 712/205; 712/206; 712/208; 712/212; 712/216; 712/23
[58] Field of Search ..................... 395/381, 382, 395/384, 388, 391, 392, 800.23; 712/205, 206, 208, 212, 215, 216, 23

[56] References Cited

U.S. PATENT DOCUMENTS

| | | | |
|---|---|---|---|
| 5,357,617 | 10/1994 | Davis et al. | 395/595 |
| 5,404,469 | 4/1995 | Chung et al. | 395/391 |
| 5,430,851 | 7/1995 | Hirata et al. | 395/388 |
| 5,546,593 | 8/1996 | Kimura et al. | 395/569 |
| 5,627,982 | 5/1997 | Hirata et al. | 395/382 |

FOREIGN PATENT DOCUMENTS 9802799  2/1998  WIPO .

OTHER PUBLICATIONS

Hirata et al, "A Multithreaded processor Architecture with Simultaneous Instruction issuing", ISS'91: International Symposium on Supercomputing, Fukuoka, Japan, Nov., 1991.

"A Multithreaded Processor Architecture with Simultaneous Instruction Issuing," by H. Hirata, Int'l Symposium on Supercomputing, Fukuoka, Japan, Nov. 1991.

An Elementary Processor Architecture with Simultaneous Instruction Issuing from Multiple Threads, by H. Hirata et al., vol. 20, No. 2, May 1, 1992, pp. 136–145.

Improving Single–Process Performance with Multithreaded Processors, by A. Temam, Proceedings of the 1996 International Conference on Supercomputing, No. CONF. 10, May 25–28, 1996, pp. 350–357.

*Primary Examiner*—Meng-Ai T. An
*Assistant Examiner*—Nabil El-Hady
*Attorney, Agent, or Firm*—Price Gess & Ubell

[57] ABSTRACT

A multithreaded processor for executing multiple instruction streams is provided. This multithreaded processor includes: a plurality of functional units for executing instructions; a plurality of instruction decode units, corresponding to the multiple instruction streams on a one-to-one basis, for respectively decoding an instruction, and producing an instruction issue request for designating to which functional unit the decoded instruction should be issued and requesting for the issuance of the decoded instruction to the designated functional unit; a holding unit for holding the priority level of each instruction stream; and a control unit for deciding which decoded instruction should be issued to a functional unit designated by two or more instruction issue requests at the same time, in accordance with the priority levels held by the holding unit.

38 Claims, 14 Drawing Sheets

Fig. 4

| PRIx [1 : 0] | STATUS |
|---|---|
| 00 | lowest |
| 01 | middle |
| 10 | highest |
| 11 | highest |

Fig. 5

| PRIx [2] | STATUS |
|---|---|
| 0 | EXECUTION |
| 1 | HALT |

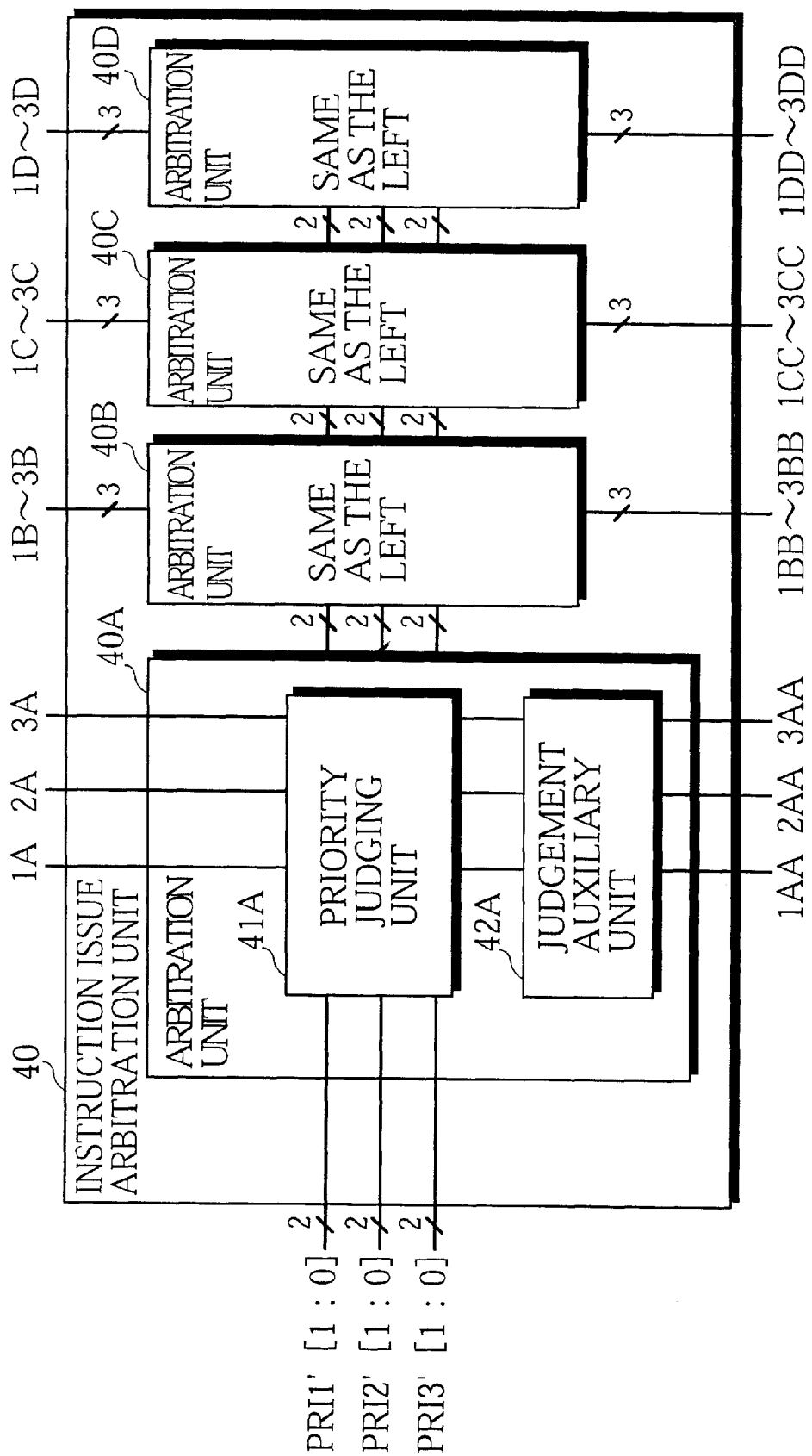

Fig. 10A PR1'>PR2'>PR3'

| INPUT 1A | 2A | 3A | OUTPUT 1A' | 2A' | 3A' |
|---|---|---|---|---|---|
| 1 | 1 | 1 | 1 | 0 | 0 |
| 1 | 1 | 0 | 1 | 0 | 0 |
| 1 | 0 | 1 | 1 | 0 | 0 |
| 1 | 0 | 0 | 1 | 0 | 0 |
| 0 | 1 | 1 | 0 | 1 | 0 |
| 0 | 1 | 0 | 0 | 1 | 0 |
| 0 | 0 | 1 | 0 | 0 | 1 |
| 0 | 0 | 0 | 0 | 0 | 0 |

Fig. 10B PR1'=PR2'>PR3'

| INPUT 1A | 2A | 3A | OUTPUT 1A' | 2A' | 3A' |
|---|---|---|---|---|---|
| 1 | 1 | 1 | 1 | 1~ | 0 |
| 1 | 1 | 0 | 1 | 1~ | 0 |
| 1 | 0 | 1 | 1 | 1 | 0 |
| 1 | 0 | 0 | 1 | 0 | 0 |
| 0 | 1 | 1 | 0 | 1 | 0 |
| 0 | 1 | 0 | 0 | 1 | 0 |
| 0 | 0 | 1 | 0 | 0 | 1 |
| 0 | 0 | 0 | 0 | 0 | 0 |

Fig. 10C PR1'>PR2'=PR3'

| INPUT 1A | 2A | 3A | OUTPUT 1A' | 2A' | 3A' |
|---|---|---|---|---|---|
| 1 | 1 | 1 | 1 | 0 | 0 |
| 1 | 1 | 0 | 1 | 0 | 0 |
| 1 | 0 | 1 | 1 | 0 | 0 |
| 1 | 0 | 0 | 1 | 0 | 0 |
| 0 | 1 | 1 | 0 | 1~ | 1~ |
| 0 | 1 | 0 | 0 | 1 | 0 |
| 0 | 0 | 1 | 0 | 0 | 1 |
| 0 | 0 | 0 | 0 | 0 | 0 |

Fig. 12

| INSTRUCTION | PROCESSING PERFORMED BY FUNCTIONAL UNIT B |
|---|---|
| inc pri | insupervisor mode : PRIx [1] ← 1<br>inuser mode : PRIx [0] ← 1 |
| dec pri | : PRIx [1] ← 0<br>: PRIx [0] ← 0 |
| halt | PRIx [2] ← 1 |
| excsv | EXCLx ← 1<br>EXCLy ← 0 |
| retex | EXCLx ← 0 |
| mov PRI,R0 | x =3 : R0 [31 : 29] ← 100(for MYID)<br>x =2 : R0 [31 : 29] ← 010(for MYID)<br>x =1 : R0 [31 : 29] ← 001(for MYID)<br>　　　　 R0 [11 : 3] ← IR[11:3](=PR13,PR12,PR11 field)<br>　　　　 R0 [2 : 0] ← PR1x field (for MYPR1) |
| mov IR,R0 | x =3 : R0 [31 : 29] ← 100(for MYID)<br>x =2 : R0 [31 : 29] ← 010(for MYID)<br>x =1 : R0 [31 : 29] ← 001(for MYID)<br>　　　　 R0 [2 : 0] ← IR[2:0](=IR3,IR2,IR1 BIT) |
| mov EXCL,R0 | x =3 : R0 [31 : 29] ← 100(for MYID)<br>x =2 : R0 [31 : 29] ← 010(for MYID)<br>x =1 : R0 [31 : 29] ← 001(for MYID)<br>　　　　 R0 [2 : 0] ← IR[2:0](=EXCL3,EXCL2,EXCL1 BIT) |

※ It should be noted that "x" indicates the logical processor number of the instruction issuer, white "y" indicates each of other logical processor numbers.

Fig. 14

| SELECT SIGNAL | | OUTPUT OF SELECTOR 68 | | |
|---|---|---|---|---|
| SPECIAL INSTRUCTION DETECTION COMPARATOR | LOGICAL PROCESSOR ID | PRI3' [1:0] PRI3 [1:0] | PRI3' [1:0] PRI3 [1:0] | PRI3' [1:0] PRI3 [1:0] |
| =0 | — | 11 | 00 | 00 |
| ≠0 | 3 | 00 | 11 | 00 |
| | 2 | 00 | 00 | 00 |
| | 1 | 00 | 00 | 11 |

MULTITHREADED PROCESSOR FOR PROCESSING MULTIPLE INSTRUCTION STREAMS INDEPENDENTLY OF EACH OTHER BY FLEXIBLY CONTROLLING THROUGHPUT IN EACH INSTRUCTION STREAM

BACKGROUND OF THE INVENTION (1). Field of the Invention

The present invention relates to an information processor which efficiently utilizes a plurality of execution units by issuing instructions from multiple instruction streams in parallel.

(2). Related Art

Conventionally, a multithreaded processor has been employed to process multiple instructions in parallel, which is fully descried in "A Multithreaded Processor Architecture with Simultaneous Instruction Issuing" In Proc. of Iss' 91: International Symposium on Supercomputing, Fukuoka, Japan, pp.87–96, November 1991.

FIG. 1 is a block diagram showing the structure of the conventional multithreaded processor. As can be seen from this figure, the multithreaded processor is provided with an instruction cache 500, three instruction fetch units 501, three decode units 502, twelve standby stations 503, four instruction schedule units 504, four functional units 505, and a register set 506. Here, three instruction streams corresponding to the three pairs of instruction fetching units and decode units in the figure are executed in parallel. An "instruction stream" means a process performed by a pair of an instruction fetch unit and a decode unit.

The instruction fetch unit 501 extracts instructions from the instruction cache 500.

The decode unit 501 decodes the instructions of each instruction stream, and then stores the decode results (hereinafter referred to simply as "instructions") into the standby stations 503 connected to the functional units 505 which are capable of processing the instructions.

The instruction schedule units 504 selects instructions from the standby stations 503, and sends them to available functional units 505. If the decoded instruction results of different instruction streams for the same one functional unit are stored in the standby stations 503, the instruction selection is performed in fixed order, so that processing can be fair among the instruction streams.

Each of the functional units 505 executes the instructions from the standby stations 503 using the register set 506. The functional units 505 may be all the same, but in many cases, they consist of various types, such as a load/store unit, an integer arithmetic logic unit, floating-point arithmetic unit, and a multiply/divide unit.

The following is an explanation of the operation of the multithreaded processor structured as above.

Being provided with three pairs of the instruction fetch units 501 and the decode units 502, the multithreaded processor shown in FIG. 1 can fetch and decode three instruction streams in parallel. As for the relationship between the three instruction streams and the programs in the instruction cache 500 (or in the main memory not shown in the figure), one program may correspond to one instruction stream (that is, the three instruction streams are generated by three programs), or one program may correspond to multiple instruction streams (that is, the three instruction streams are generated by one program). The latter includes the case where one image processing program is performed as multiple instruction streams with respect to different image data.

Instruction decoded by the decode units 502 are issued to the functional units corresponding to the instructions via the standby stations 503 and the instruction schedule units 504. Each functional unit executes any instruction issued from any instruction stream.

As described so far, the multithreaded processor is characterized by processing multiple instruction streams in parallel using execution units shared by the multiple instruction streams.

As one multithreaded processor processes multiple instruction streams inside itself, one unit for executing one instruction stream will be hereinafter referred to as a logical processor.

Each logical processor has a decode unit, an instruction sequence control mechanism, and a register set, so as to process an instruction streams independently of each other. Functional units and a cache memory are shared by a plurality of logical processors.

Meanwhile, the overall processor will be hereinafter referred to as a physical processor in contrast with the logical processors.

Unlike the multithreaded processor, a conventional superscalar processor can process only one instruction stream at a time, because only the functional units are multiplexed. Furthermore, pipeline interlock frequently occurs in the superscalar processor due to the dependence between instructions. For the above reasons, it is difficult to improve the efficiency of the functional units and the throughput of the superscalar processor. Meanwhile, the above-mentioned multithreaded processor processes multiple instruction streams so as to improve efficiency of the functional units and throughput of the processor itself.

However, the multithreaded processor of the above structure has the following problems.

The first problem is that since a plurality of logical processors shares the same functional units, several instructions issued from multiple instruction streams competes for the functional units. This dramatically reduces the number of instruction issues of a specific logical processor, deteriorating efficiency of the specific logical processor. In the case where the load greatly varies among the logical processors, even if instruction streams having the same process content (generated by the same program) are allocated to the logical processors one by one, the process of a specific instruction stream will be delayed, resulting in variation in finish time of the processes and preventing the processes from speeding up.

The second problem is that even if instruction streams having different process contents are allocated to the logical processors and a specific instruction stream is intended to be processed first, the process speed of the specific logical processor cannot be increased, and the specific logical processor cannot occupy the shared resource. For these reasons, the overall efficiency decreases. This case applies to the case where an urgent interrupt occurs, for example.

SUMMARY OF THE INVENTION

The object of the present invention is to provide a multithreaded processor which can flexibly control the efficiency in execution of each instruction stream so as to improve the overall throughput.

The above object can be achieved by providing a multithreaded processor for executing multiple instruction streams. This multithreaded processor comprises: a plurality of functional units each for executing an instruction; a plurality of instruction decode units corresponding to the multiple instruction streams on a one-to-one basis, each for decoding an instruction, and producing an instruction issue request for designating to which functional unit the decoded instruction should be issued and requesting for the issuance of the decoded instruction to the designated functional unit; a holding unit for holding priority level of each of the instruction streams; and a control unit for deciding which decoded instruction should be issued to a functional unit designated by two or more instruction issue requests at the same time, in accordance with the priority levels stored by the holding units.

With this structure, the instruction to be issued to each functional unit (or the decode result of the instruction) is determined in accordance with the priority levels, so that the variation of load among the multiple instruction streams can be flexibly adjusted in accordance with the priority levels. Thus, the efficiency required for executing each instruction stream can be properly attained so as to improve the overall throughput of the processor.

The object of the present invention can also be achieved by providing a multithreaded processor having the same structure as the above-mentioned multithreaded processor, except that the holding unit further has flags which can be set by an instruction for indicating whether each instruction stream should be halted or executed, and the control unit includes: an arbitration unit for making the decision; and a stop unit for stopping an instruction stream corresponding to a flag indicating a halt by excluding the instruction issue requests of the instruction streams corresponding to the flags in making the decision.

With this structure, an instruction stream in an idle state or in a wait state can be put into a halt state. As a result, priority can be given to the remaining instruction streams, so as to improve the overall throughput.

The object of the present invention can also be achieved by providing a multithreaded processor having the same structure as the above-mentioned multithreaded processor, except that the control unit further includes a prohibition unit for temporarily prohibiting issuance of the instruction decided to be issued by the control unit to the functional unit, if there is a process which needs to be processed urgently in an instruction stream to which the instruction belongs.

According to this structure, if an interrupt occurs to an instruction stream (or a logical processor), the prohibition unit temporarily prohibits the logical processor from issuing an instruction. In other words, the prohibition unit temporarily prohibits instruction issuance during a predetermined number of cycles required for moving to the interrupt process. Thus, the transition to the interrupt process can be expedited. Furthermore, the prohibition unit can prohibit the issuance of an instruction even after the arbitration unit has decided the issuance of the instruction, so that an issuance prohibition can be issued even if an urgent process occurs after the arbitration unit has made a decision. For instance, even if there is a process to be urgently performed at a later stage during a machine cycle, instruction issuance can be prohibited.

The object of the present invention can also be achieved by providing a multithreaded processor having the same structure as the above-mentioned multithreaded processor, except that one of the functional units receives a special instruction for ordering to change the priority level of an instruction stream to which the special instruction belongs, the priority level being one of the priority levels held by the holding unit.

The object of the present invention can also be achieved by providing a multithreaded processor having the same structure as the above-mentioned multithreaded processor, except that the special instruction is made up of only an operation code for indicating whether the priority levels should be raised or lowered, and that one of the functional units detects which instruction decode unit has issued the special instruction in the case where a decode result of the special instruction is issued, and then raises or lowers the priority level of an instruction stream corresponding to the detected instruction decode unit.

According to this structure, the special instruction does not require operands indicating the bit positions to specify instruction streams and the IDs of the instruction streams. For this reason, the priority level of each instruction stream can be readily changed by the same instruction.

Since the priority level of the instruction stream to which the instruction belongs is changed by one functional unit, other instruction streams are not inadvertently rewritten. Thus, malfunction can be prevented. For instance, when performing the same image processing on RGB color image data, that is, when executing one image processing program as three instruction streams simultaneously and independently of each other, information can be opacified (there is no need to distinguish between the programs for R, G, and B), and the independence of each instruction stream can be guaranteed. As a result, the reliability of the OS and the overall system can be improved.

The object of the present invention can also be achieved by providing a multithreaded processor having the same structure as the above-mentioned multithreaded processor, except that the holding unit includes a control register which has a first field for read only, and that one of the functional units detects which instruction decode unit has issued a read instruction when the decode result of the read instruction of the control register is issued, and outputs the ID of the instruction stream corresponding to the detected instruction decode stream as the read data of the first field to an internal bus.

According to this structure, if three instruction streams derived from one program are executed simultaneously and independently of each other as described above, three virtual programs which are derived from one program are executed in parallel. The ID of each virtual program, (or each instruction stream) can be easily obtained by reading out the first field.

The object of the present invention can also be achieved by providing a multithreaded processor having the same structure as described above, except that the holding unit has a control register which includes individual fields corresponding to the multiple instruction streams on a one-to-one basis for holding inherent data of the multiple instruction streams, and a second field for read only, and that one of the functional units reads out the individual field of each of the multiple instruction streams upon execution of a read instruction of the control register, and outputs the inherent data of the instruction stream corresponding to the instruction decode unit that has issued the read instruction as the read data of the second field to the internal bus.

According to this structure, the priority level of the above-mentioned can be easily obtained by reading out the second field.

The object of the present invention can also be achieved by providing a multithreaded processor having the same structure as described above, except that the holding unit includes priority fields for holding the priority level of each instruction stream, that the priority field of each instruction stream is made up of minor fields indicating the priority level of each instruction stream in each execution mode, and that one of the functional units detects which instruction decode unit has issued the special instruction in the case where the decode result of the special instruction is issued, and then raises or lowers the priority level of each minor field for the current execution mode among the priority fields of the instruction stream corresponding to the detected instruction decode unit.

According to this structure, the priority levels can be set separately for user mode and supervisor mode, and when returning from another mode, the original priority levels can be retained.

The object of the present invention can also be achieved by providing a multithreaded processor having the same structure as described above, except that it further comprises: a specified instruction detecting unit for detecting that one of the functional units has started executing a specified instruction, and which instruction decode unit has issued the decode result of the specified instruction; and a temporary modification unit for temporarily modifying, if the specified instruction detecting unit has detected the execution start of a specified instruction. Here, the priority level of the instruction stream corresponds to the instruction decode unit which has issued the specified instruction over a predetermined period of time, and the priority level is modified so as to be higher than the priority levels of other instruction streams.

According to this structure, since the temporary modification unit temporarily changes the priority levels, the instruction string starting with the specified instruction in each instruction stream is always executed in continuous cycles.

The object of the present invention can also be achieved by providing a multithreaded processor having the same structure as described above, except that it further comprises an exclusive halt data holding unit for holding exclusive halt data for each instruction stream, the exclusive halt data indicating that one instruction stream should be in an execution state, and that the remaining instruction streams should be in a halt state. Here, the stop unit stops notifying the arbitration unit of the issuance of an instruction issue request from the instruction decode unit corresponding to instruction streams kept in a halt state by the exclusive halt data.

According to such a structure, one instruction stream can forcibly stops the execution of other instruction streams. Thus, the throughput can be adjusted over a wide range among the instruction streams.

The object of the present invention can also be achieved by providing a multithreaded processor which executes multiple instruction streams simultaneously and independently of each other. This multithreaded processor comprises: a plurality of instruction cache units for temporarily storing instructions of the multiple instruction streams; a plurality of instruction fetch units corresponding to the multiple instruction streams on a one-to-one basis, each for fetching an instruction of each instruction stream from the instruction cache units; a priority designating unit for designating the priority level of each of the multiple instruction stream; and an instruction fetch control unit for arbitrating between instruction fetch requests issued by two or more instruction cache units, in accordance with the priority levels designated by the priority designating unit.

According to this structure, the competition among fetch requests from the plurality of instruction fetch units is arbitrated when they compete for one instruction cache unit. Thus, the throughput of each instruction stream can be flexibly adjusted in the upstream of the multithreaded processor.

The object of the present invention can also be achieved by providing a multithreaded processor provided with a plurality of functional units for executing instructions, a plurality of instruction decode units for decoding an instruction fetched from an instruction cache unit and outputting an instruction issue request to a designated functional unit, and the same number of register sets as the instruction decode units, which executes the same number of instruction streams as the instruction decode units simultaneously and independently of each other. This multithreaded processor comprises: a holding unit for holding the priority level of each instruction stream that can be set by an instruction in each instruction stream; and a control unit for arbitrating between two or more instruction streams sharing the same resource, in accordance with the priority levels. Here, the shared resource is a functional unit for which instruction issue requests from two or more instruction decode units compete, or an instruction cache unit for which fetch requests from two or more instruction decode units compete, or one register set for which access requests from two or more functional units compete.

According to this structure, if execution requests from multiple instruction streams compete for the shared resource, the competition among them will be arbitrated in accordance with the priority levels. Thus, the throughput of each instruction stream can be flexibly adjusted.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows the lower 2 bits of the priority designating register of the instruction stream control unit in the embodiment of the present invention.

FIG. 5 shows the higher 1 bit of the priority designating register of the instruction stream control unit in the embodiment of the present invention.

FIG. 9 is a block diagram showing a detailed example structure of the instruction issue arbitration unit in the embodiment of the present invention.

FIGS. 10A, 10B, and 10C show the control logic of the priority judging unit in the embodiment of the present invention.

FIG. 12 shows the contents of an exclusive instruction for a functional unit and a fetch instruction for a control register.

FIG. 14 shows the relationship between select signals inputted into the selector inside the continuous cycle prioritized unit and output values of the selector.

DESCRIPTION OF THE PREFERRED EMBODIMENTS

Structure of Multithreaded Processor

Figure 2:
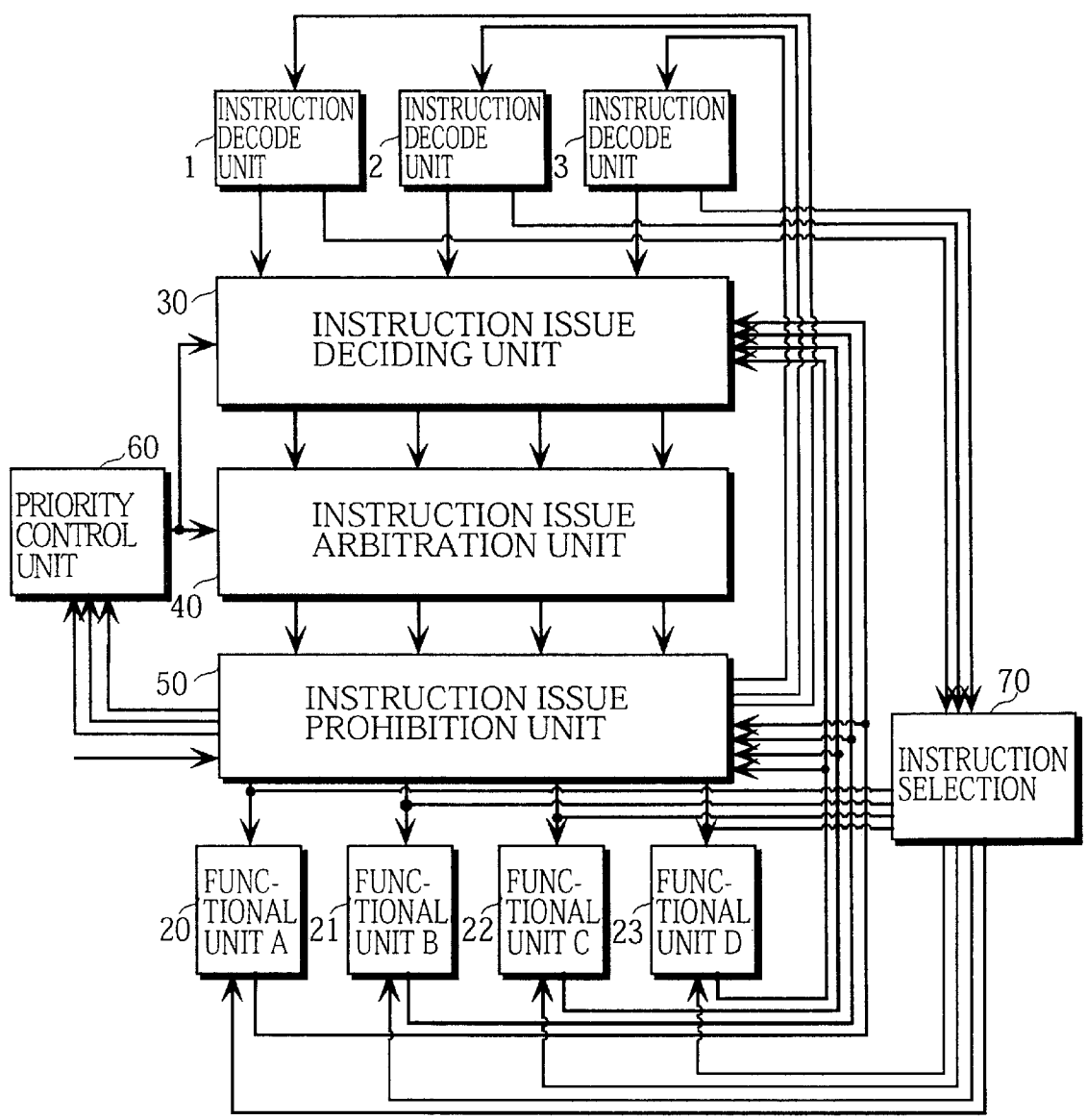
FIG. 2 is a block diagram showing the structure of a multithreaded processor of an embodiment of the present invention.

FIG. 2 is a block diagram showing the structure of the main components of a multithreaded processor of an embodiment of the present invention.

The multithreaded processor comprises instruction decode units 1 to 3, functional units A20, B21, C22, and D23, an instruction issue deciding unit 30, an instruction issue arbitration unit 40, an instruction issue prohibition unit 50, a priority control unit 60, and an instruction selecting unit 70. The multithreaded processor is made to arbitrate instruction issuance to each functional unit in accordance with the execution status, priority of the instruction streams, and external factors.

Figure 1:
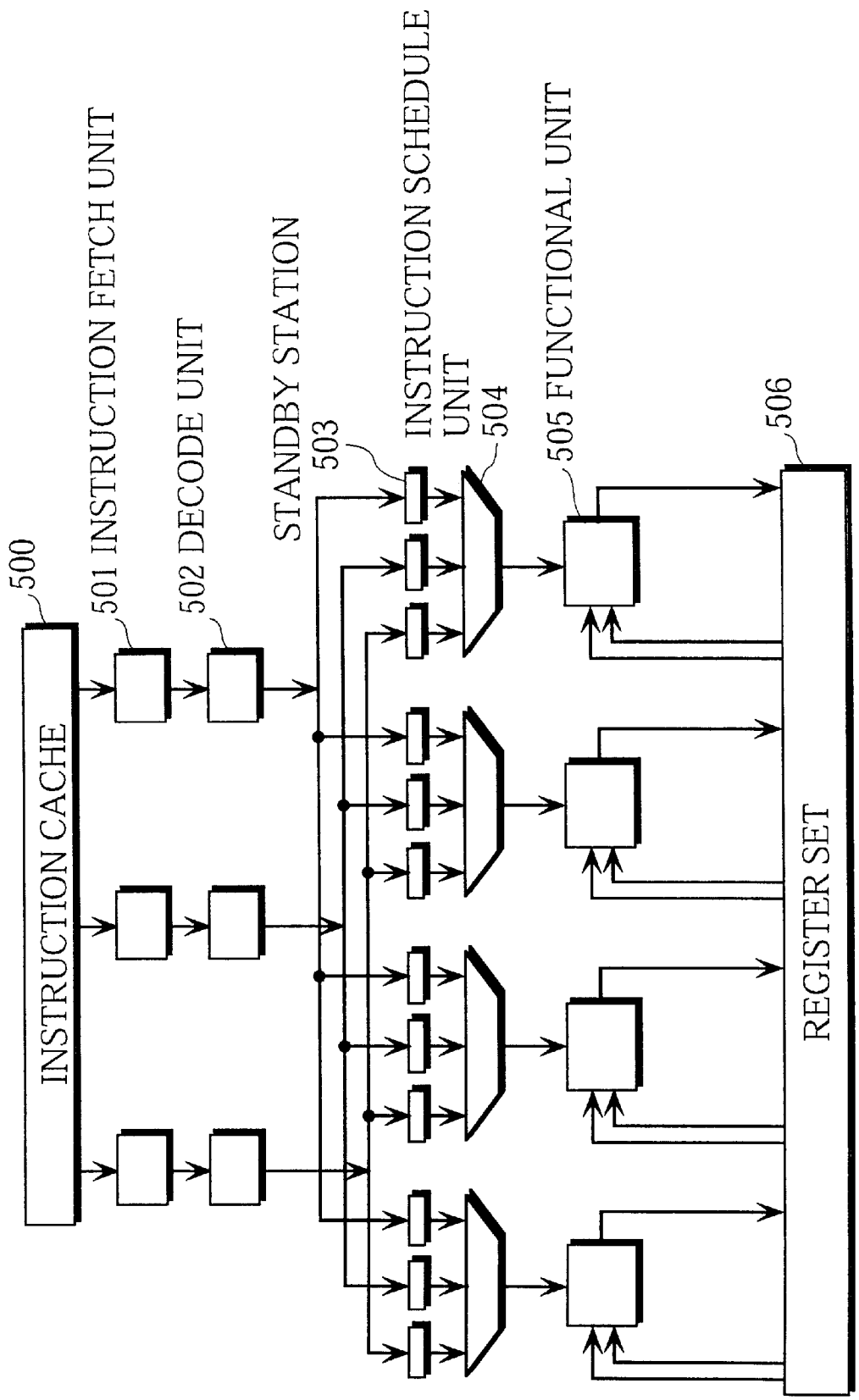
FIG. 1 is a block diagram showing the structure of a conventional multithreaded processor.

The multithreaded processor comprises an instruction cache, instruction fetch units, and register files shown in FIG. 1, though they are not shown in FIG. 2. Likewise, explanations of detailed structures, such as the number of pipeline stages of each functional unit, are not provided below. For ease of explanation, in this embodiment, each instruction decode unit decodes one instruction from one instruction stream, and one instruction is issued at a time.

In FIG. 2, the instruction decode units 1 to 3 decode instructions of the respective instruction streams, and output as the decode results an instruction issue request to the instruction issue deciding unit 30, and the instruction contents (operations) to the instruction selecting unit 70. The instruction issue request contains a flag for requesting instruction issuance (hereinafter referred to as "request flag"), and information as to which functional unit processes the instruction (this information will be hereinafter referred to as "functional unit number"). As the instruction decode units 1 to 3 decode the instruction streams independently of each other, they correspond to the above logical processors. Since three logical processors are contained in one physical processor, the number of instruction decode units provided in this embodiment is three. Hereinafter, the logical processors corresponding to the instruction decode units 1 to 3 will be referred to as logical processors 1 to 3. Likewise, the instruction streams corresponding to the logical processors 1 to 3 will be referred to as instruction streams 1 to 3.

The functional units A20, B21, C22, and D23 (hereinafter referred to as functional units A, B, C, and D) execute instructions (or decode results) issued from the instruction decode units 1 to 3 via the instruction selecting unit 70, that is, they perform data access and arithmetic operations. The function of each functional unit is the same as one another, but an example is described below for ease of explanation.

The functional unit A is a load/store unit for executing a memory access instruction, the functional unit B is an integer arithmetic unit for performing an integer arithmetic, the functional unit C is a floating-point unit for performing floating-point addition and subtraction, and converting between an integer and a floating-point number, and the functional unit D is a floating-point unit for performing floating-point multiplication and division. The functional unit B of this embodiment further has the function of executing an instruction concerning the setting of priority as part of integer calculation process. These functional units are components of the logical processors 1 to 3, but do not correspond to them one by one. The functional units are shared by the logical processors 1 to 3. Each functional unit also notifies the instruction issue deciding unit 30 whether it is ready to receive an instruction or not (the status of each functional unit will be hereinafter referred to simply as "ready" or "not ready").

The instruction issue deciding unit 30 judges to which functional unit an instruction should be issued, upon receipt of an instruction issue request (the above-mentioned request flag and functional unit number) from the instruction decode units 1 to 3. According to a notice from each functional unit as to whether it is ready to receive an instruction and a notice from the priority control unit 60 as to whether each logical processor is in a halt state or in an execution state, the instruction issue deciding unit 30 further judges whether an instruction can be issued to each of the functional units A to D.

The instruction issue arbitration unit 40 arbitrates between the instruction issue requests to determine one instruction to be issued in accordance with the priority designated by the priority control unit 60 for each logical processor, in the case where a plurality of instruction issue requests compete for one functional unit.

The instruction issue prohibition unit 50 definitely judges whether the instruction should be issued and informs the instruction selecting unit 70 of the instruction issuance, upon receipt of the arbitration result of the instruction issue arbitration unit 40. More specifically, if an instruction to be urgently processed is issued to each logical processor, the instruction issue prohibition unit 50 temporarily inhibits the issuance of instruction from the instruction stream of the logical processor, and if there are no emergencies, the instruction issue prohibition unit 50 orders the instruction selecting unit 70 to issue an instruction. The reason the instruction issue prohibition unit 50 temporarily prohibits instruction issuance is that when there is an instruction to be urgently processed as described above after the operations of the instruction issue deciding unit 30 and the instruction arbitration unit 40, the instruction should be given top priority. Furthermore, the instruction issue prohibition unit 50 can prohibit the issuance of an instruction even after the instruction issue arbitration unit 40 has decided the issuance of the instruction, so that an issuance prohibition can be issued even if an urgent process occurs after the instruction issue arbitration unit 40 has made a decision. For instance, even if there is a process to be urgently performed at a later stage during a machine cycle, instruction issuance can be prohibited.

The priority control unit 60 controls the priority level of each logical processor, and also controls the information showing whether each logical processor is in an execution state or in a halt state. It then informs the instruction issue arbitration unit 40 of the priority level, and the instruction issue deciding unit 30 of whether each logical processor is in an execution state or not. The priority control unit 60 further has a function of giving priority to the logical processor during a predetermined number of continuous cycles (this function will be hereinafter referred to as "continuous cycle prioritizing function"). To control the information as to the priority and whether it is in an execution state, the priority control unit 60 comprises three control registers, that is, a priority designating register, an internal interruption register, and exclusive halt register. These registers have values set in accordance with instructions of the instruction streams.

The instruction selecting unit 70 issues instructions (operation instructions) decoded by the instruction decode units 1 to 3, to the functional units A to D, in response to an instruction issue command designating the instruction issuer decode unit and the recipient functional unit.

[Priority Control Unit 60: Priority Designating Register]

Figure 3:
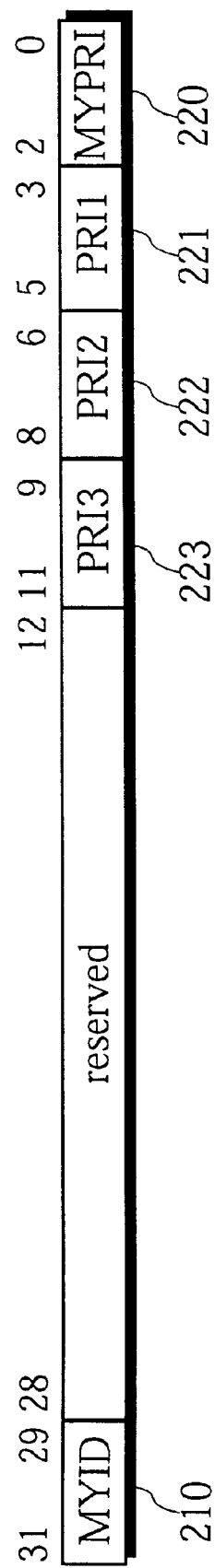
FIG. 3 shows the priority designating register of the instruction stream control unit in the embodiment of the present invention.

FIG. 3 shows the bit configuration of the priority designating register (hereinafter referred to as "PRI register") contained in the priority control unit 60.

As can be seen from the figure, the PRI register has fields MYID, PRI3, PRI2, PRI1, and MYPRI, and holds the information as to the priority of each logical processor and whether each logical processor is in a halt state.

The MYID field indicates the ID of the logical processor which executes a read instruction for the PRI register. If the read instruction is executed in the logical processor 3, the ID indicating the logical processor 3 ("100", for instance) is read out.

The PRI3 indicates the priority of the logical processor 3 and whether the logical processor 3 is in a halt state.

The PRI2 and PRI1 fields indicate the same as the PRI3 with respect to the logical processors 2 and 1, respectively.

The MYPRI field indicates the priority of the logical processor which executes the read instruction for the PRI register. For instance, the content of the PRI1 field is copied and then read out upon execution of the read instruction in the logical processor 1.

FIG. 4 shows each lower 2-bit allocation of the PRI3 to PRI1 fields in the PRI register. In this figure, the PRI3 to PRI1 fields are shown as PRIx, and the bit positions in the fields are shown in brackets "[ ]". "x" indicates a logical processor number (or thread number).

As can be seen from the figure, PRIx[1:0] indicates three priority levels: the lowest, the middle, and the highest. The three priority levels are indicated by two bits, so that PRIx[1] can be set for supervisor mode, while PRIx[0] can be set for user mode. The setting of priority is conducted by the functional unit B in accordance with a special instruction (in mnemonic code) described in the following.

"inc pri": this instruction raises the priority, that is, PRIx[1] is 1 in the supervisor mode, while PRIx[0] is set to 1 in the user mode.

"dec pri": this instruction lowers the priority, that is, PRIx[1] is set to 0 in the supervisor mode, while PRIx[0] is 0 in the user mode.

Unlike data transfer instructions between general registers, the above instructions consist of operation codes without operands, so that the same instruction can be used in any instruction stream. For instance, they are useful in the case where multiple instruction streams are generated from one program and processed in parallel, with different data being assigned to each instruction stream.

Since the priority level of the instruction stream to which the instruction belongs is changed by one functional unit, other instruction streams are not inadvertently rewritten. Thus, malfunction can be prevented. For instance, when performing the same image processing on RGB color image data, that is, when executing one image processing program as three instruction streams simultaneously and independently of each other, information can be opacified (there is no need to distinguish between the programs for R, G, and B) and the independence of each instruction stream can be guaranteed. As a result, the reliability of the OS and the overall system can be improved.

By using these instructions and bit allocation shown in the figure, even if the priority is changed along with a mode change from the user mode to the supervisor mode, the original priority will be retained when it returns to the user mode. For instance, even if it temporarily enters the supervisor mode due to interrupt occurrence in the user mode, the priority in the user mode will be retained by resetting PRIx[1] to the original value before returning from the interrupt process to the user mode.

FIG. 5 shows each higher 1-bit allocation of the PRI3 to PRI1 fields in the PRI register showing the priority.

As can be seen from the figure, PRIx[2] indicates whether the logical processor is in an execution state or in a halt state. The setting of status change from an execution state to a halt state is conducted by the functional unit B in accordance with a special instruction (in mnemonic code) shown in the following.

"halt": this instruction put the issuer logical processor in a halt state, that is, PRIx[2] of the logical processor is set to 1. The halt state caused by this instruction is called a self-halt state to distinguish from halt states by other instructions.

Return from a self-halt state to an execution state is conducted by interrupt input to the logical processor, instead of an instruction. Since interrupts occur to the logical processors independently of each other in a multithreaded processor, a self-halt state is cancelled when an interrupt (an external or internal interrupt) occurs to a logical processor in the self-halt state.

[Priority Control Unit 60: Internal Interrupt Register]

Figure 6:
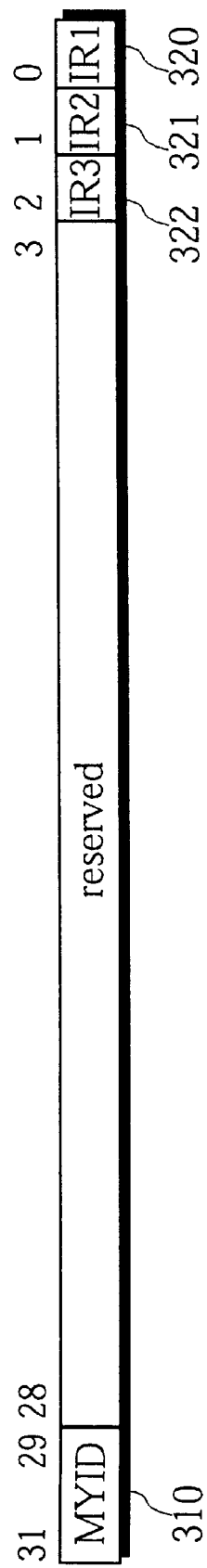
FIG. 6 shows the structure of the internal interrupt register of the instruction stream control unit in the embodiment of the present invention.

FIG. 6 shows the bit configuration of the internal interrupt register (hereinafter referred to as "IR register") contained in the priority control unit 60. The "internal interrupt" refers to an interrupt between logical processors, that is, an interrupt from one logical processor to another. An internal interrupt can be used for processing instructions in synchronization with logical processors or communicating in synchronization with logical processors, because the self-halt state of one logical processor is cancelled by another logical processor.

As shown in FIG. 6, the IR register includes a MYID field and IR3 to IR1 bits, and makes an internal interrupt request to another logical processor.

The MYID field is the same as the MYID field shown in FIG. 5, and therefore, an explanation of it is not provided here.

The IR3 bit indicates that a processor makes an internal interrupt request to the logical processor 3. When this bit is "ON", PR3[2] is reset to 0 while IR3 is returned to "OFF" under the control of the instruction decode unit 3, which has received the interrupt request. Here, the self-halt state of the logical processor 3 is cancelled by resetting PR3[2] to 0.

The IR2 and IR1 bits are interrupt request bits for the logical processors 2 and 1, respectively, and they are the same as the IR3 bit.

The setting of the IR3 to IR1 bits are conducted in accordance with a conventional register transfer instruction. With the conventional register transfer instruction, it is necessary to write into the positions of IR3 to IR1, and therefore, each instruction stream need to distinguish its own logical processor ID from the interrupt destination logical processor ID. By reading out the above MYID field, each instruction stream can identify its logical processor ID.

[Priority Control Unit 60: Exclusive Halt Register]

Figure 7:
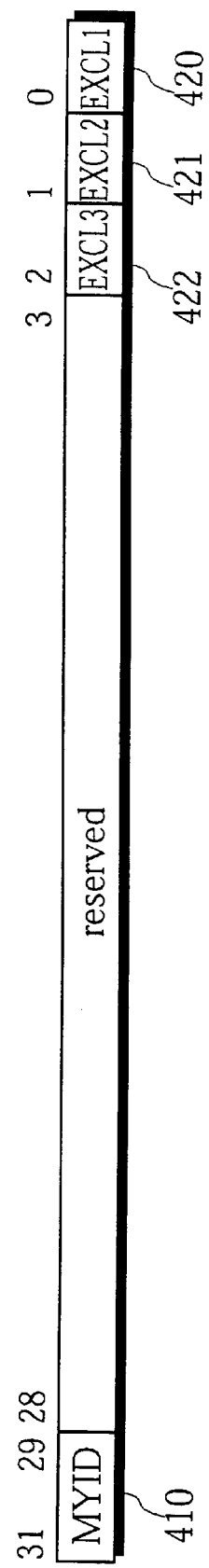
FIG. 7 shows the structure of the exclusion stop register of the instruction stream control register in the embodiment of the present invention.

FIG. 7 shows the bit configuration of the exclusive halt register (hereinafter referred to as "EXCL register") contained in the priority control unit 60. Here, "exclusive halt" refers to a halt of a processor other than a predetermined processor. It should be noted that two or more logical processors cannot be in an exclusive halt state at the same time.

As shown in FIG. 7, the EXCL register has a MYID field and EXCL3 to EXCL1 bits, and orders that one logical processor be put in an execution state, and the remaining logical processors be put in a halt state.

The MYID field is the same as in FIG. 3 and FIG. 6, and therefore, it is not described below.

If the EXCL3 bit is "ON", the logical processor 3 is in an exclusive halt state. In such a case, only the logical processor 3 can operate, and the logical processors 2 and 1 will be in a halt state.

The EXCL2 and EXCL1 bits are the same as the EXCL3 bit.

The setting and resetting of the EXCL3 to EXCL1 bits are conducted by the functional unit B in accordance with a special instruction (in mnemonic code) described in the following.

"excsv": this instruction sets an exclusive halt to the issuer logical processor, that is, halts the logical processors except for the issuer logical processor. For instance, if the logical processor 1 executes this instruction, EXCL1 is "ON", while EXCL2 and EXCL3 are set to "OFF". Even if a plurality of logical processors issue this instruction at the same time, not all the processors will stop their operations, because this instruction is executed only for the functional unit B.

"retex": this instruction cancels an exclusive halt of the issuer logical processor, that is, it returns the remaining logical processors into the original state. For instance, if the logical processor 1 executes this instruction, EXCL1 is set to "OFF".

These instructions can be used as the incpr instruction and the decpr instruction in any instruction stream without operands.

The three control registers, the PRI register, the IR register, and the EXCL register, are separate entities, but the MYID field of each register and the MYPRI field of the PRI register indicate the value of the logical processor itself. This is the reason that each logical processor appears to have a different register. Furthermore, since the addressing of these control registers is the same in all the logical processors, it is possible to obtain the ID and priority of each logical processor even when the same instruction is executed.

[Instruction Issue Deciding Unit 30]

Figure 8:
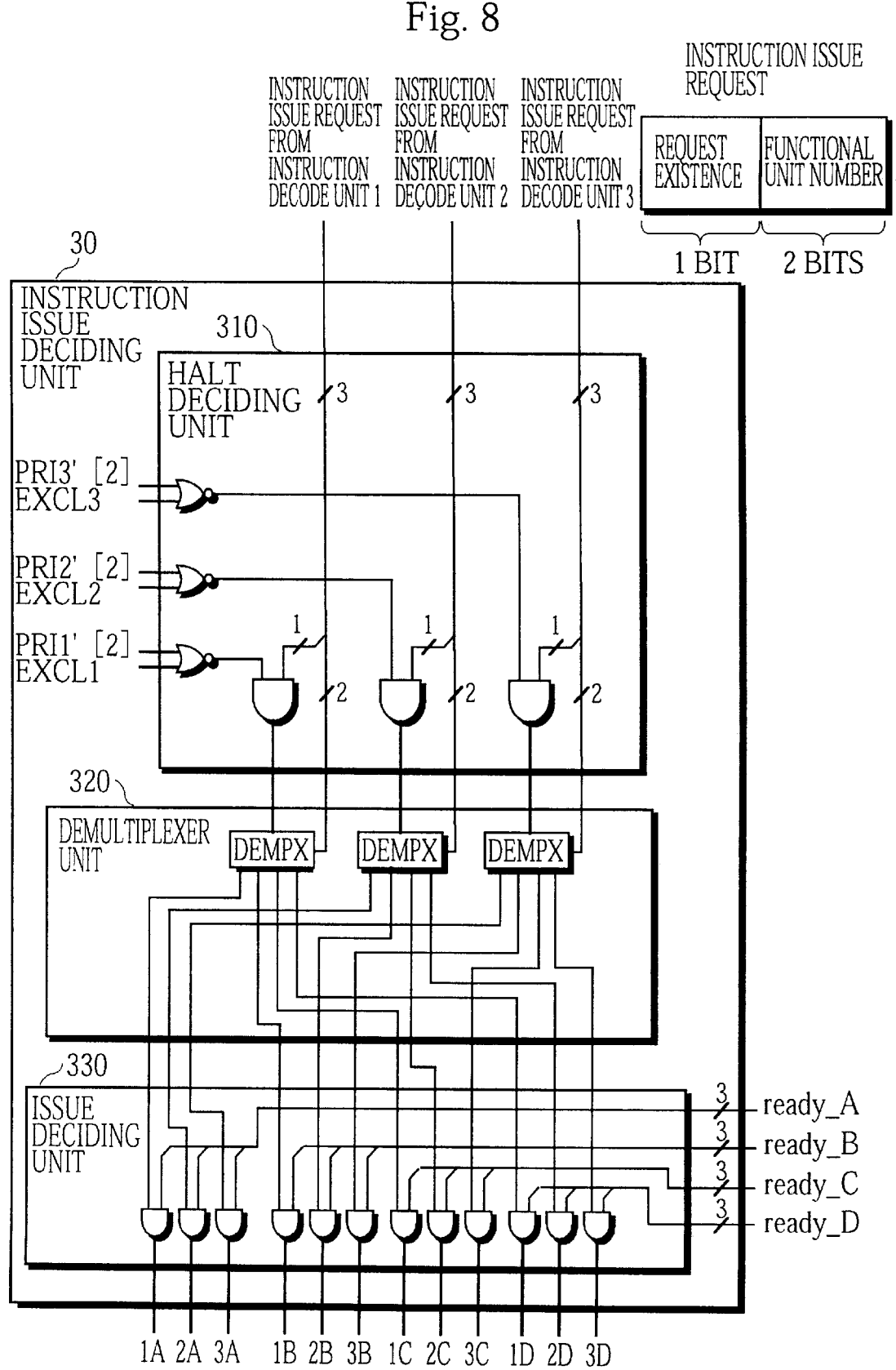
FIG. 8 is a block diagram showing detailed example structure of the instruction issue deciding unit in the embodiment of the present invention.

FIG. 8 is a block diagram showing a detailed structure of the instruction issue deciding unit 30 of FIG. 2. This instruction issue deciding unit 30 comprises a halt deciding unit 310, a demultiplexer unit 320, and an issue deciding unit 330.

The halt deciding unit 310 includes three pairs of NOR circuits and AND circuits corresponding to the instruction decode units 1 to 3. Upon receipt of the above-mentioned instruction issue request (consisting of a request flag and a functional unit number) from the instruction decode units, each pair of a NOR circuit and an AND circuit forcibly turns the signal of the request flag (hereinafter referred to as "request existence signal") off in the case where each logical processor is in a self-halt state (where PRIx[2] of the PRI register is on) or in an exclusive halt state (where the EXCLx bit is on), and it outputs the request existence signal as it is, in the case where each processor is in an execution state and not in an exclusive halt state.

The demultiplexer unit 320 includes three demultiplexers corresponding to the respective instruction decode units 1 to 3. In accordance with the functional unit number, each demultiplexer disperses a request existence signal, inputted via the halt deciding unit 310, to the functional unit to execute the instruction. As a result, each instruction decode unit outputs a request existence signal to each functional unit.

The issue deciding unit 330 includes four sets of AND circuits corresponding to the respective functional units A to D. Each set of AND circuits output a request existence signal dispersed by the demultiplexer unit 320 as it is, in the case where the corresponding functional unit is in a ready state as described above, while each set of AND circuits turn the request existence signal off before output in the case where the corresponding functional unit is not in a ready state. A ready_n signal (n is A, B, C, or D) indicates that the corresponding functional unit is in a ready state. It is a 3-bit signal outputted from the functional unit x corresponding to the logical processors 1 to 3. Output signals (1A to 3A, 1B to 3B, 1C to 3C, and 1D to 3D) from the issue deciding unit 330 are all effective (that is, instruction issuance is possible) when the logical value is "1". For instance, the output signal 1A indicates that the instruction issuer is the instruction decode unit 1 and the destination is the functional unit A, while the output signal 3B indicates that the instruction issuer is the instruction decode unit 3 and the destination is the functional unit B.

[Instruction Issue Arbitration Unit 40]

FIG. 9 is a block diagram showing a detailed structure of the instruction issue arbitration unit 40 of FIG. 2. The instruction issue arbitration unit 40 comprises arbitration units 40A to 40D corresponding to the respective functional units A to D. As each arbitration unit operates in the same manner, the following description concerns only the arbitration unit 40A, which includes a priority judging unit 41A and a judgement auxiliary unit 42A.

The priority judging unit 41A receives the signals 1A, 2A, and 3A outputted from the issue deciding unit 330, and the priority (PRI1[1:0], PRI2[1:0], PRI3[1:0]) of each logical processor. The priority judging unit 41A then outputs the request existence signal having the highest priority. The control logic to perform this process with the priority judging unit 41A are shown in FIGS. 10A to 10C.

FIG. 10A shows input 1A, 2A, and 3A, and output 1A', 2A', and 3A' in the case where the priority of the logical processors 1 to 3 designated by the PRI1, PRI2, and PRI3 fields in the PRI register is shown as PRI1>PRI2>PRI3, that is, where PRI1 has the highest priority and PRI3 has the lowest priority. Though not shown in the figure, if PR1>PRI3>PRI2, PRI2>PRI1>PRI3, PRI2>PRI3>PRI1, PRI3>PRI1>PRI2, or PRI3>PRI2>PRI1, the same control logic as above can be obtained by reading the signals by different names.

FIG. 10B shows the case where PRI1=PRI2>PRI3, that is, where (PRI1, PRI2, PRI3)=(highest, highest, middle), (highest, highest, lowest), or (middle, middle, lowest). Though not shown in the figure, if PRI1=PRI3>PRI2, PRI2=PRI1>PRI3, PRI2=PRI3>PRI1, PRI3=PRI1>PRI2, or PRI3=PRI2>PRI1, the same control logic as above can be obtained by reading the signals by different names. If there are two or more effective signals having the highest priority among input signals, as the output signals marked by wavy lines in the figure, the priority judging unit 41A outputs them as "1".

FIG. 10C shows the case where PRI1>PRI2=PRI3, that is, where (PRI1, PRI2, PRI3)=(highest, middle, middle), (highest, lowest, lowest), or (middle, lowest, lowest). Though not shown in the figure, if PRI1>PRI3=PRI2, PRI2>PRI1=PRI3, PRI2>PRI3=PRI1, PRI3>PRI1=PRI2, or PRI3>PRI2=PRI1, the same control logic as above can be obtained by reading the signals by different names.

The priority judging unit 41A outputs all effective signals as "1" in the case where PRI1=PRI2=PRI3, that is, there are two or more effective input signals.

If two or more logical processors having the same priority in the PRI register issue an instruction issue request at the same time, that is, if two or more outputs of the priority judging unit 41A (1A', 2A', and 3A') are "1", the judgement auxiliary unit 42A determines which one of the outputs (1A', 2A', and 3A') of the priority judging unit 41A should be "1" so as to allow the logical processors instruction issuance fairly. For instance, the judgement auxiliary unit 42A: (1) selects a different logical processor to be "1" every one cycle or every few cycles; (2) gives priority to logical processors which have not issued an instruction; and (3) definitely determines which logical processor should be "1". The judgement auxiliary unit 42A may switch the operation manner among (1), (2), and (3).

[Instruction Issue Prohibition Unit 50]

Figure 11:
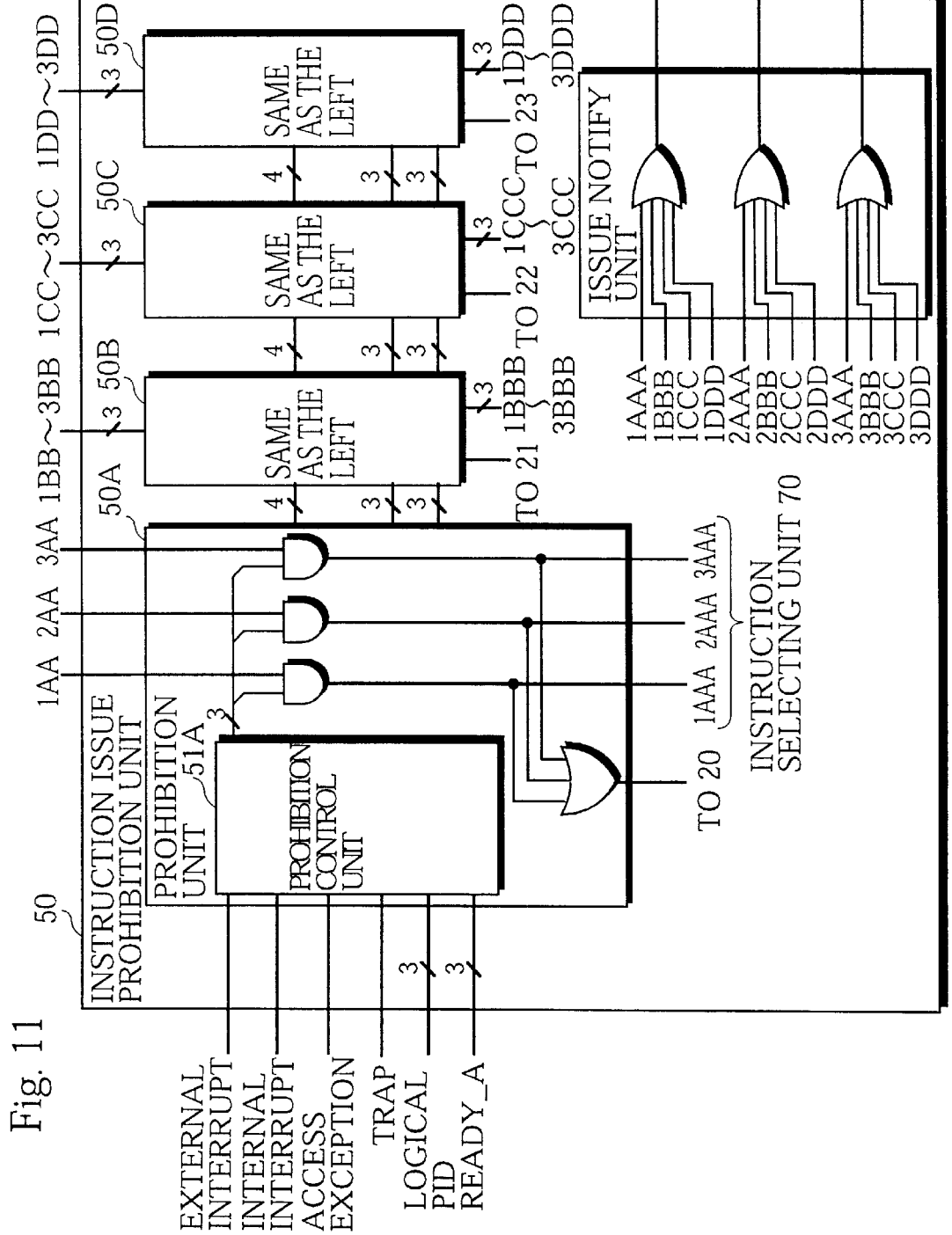
FIG. 11 is a block diagram showing a detailed example structure of the instruction issue prohibition unit in the embodiment of the present invention.

FIG. 11 is a block diagram showing the detailed structure of the instruction issue prohibition unit 50. This instruction issue prohibition unit 50 comprises prohibition units 50A to 50D corresponding to the respective functional units A to D, and an issue notification unit 55. Since all the prohibition units operate in the same manner, the following description concerns only the prohibition unit 50A.

The prohibition unit 50A includes a prohibition control unit 51A for detecting the ID of a logical processor which has urgently issued an external interrupt request, an internal interrupt request, an access exception such as a cache miss and memory access error, and a trap instruction, and for controlling so as to prohibit instruction issuance to the issuer logical processor during one cycle, three AND circuits for outputting to the instruction selecting unit 70 instruction issue commands 1AAA to 3AAA obtained by gating output signals 1AA to 3AA from the arbitration unit 40A in accordance with instructions from the prohibition control unit 51A, and an OR circuit for notifying the functional unit A of the instruction issuance.

The issue notification unit 55 comprises three OR circuits corresponding to the respective instruction decode units 1 to 3. Every time an instruction issue command is outputted from the prohibition units 51A to 51D to each logical processor, the issue notification unit 55 outputs an issue notification for notifying the corresponding instruction decoding unit that the next instruction can be issued.

[Functional Unit B]

The functional unit B executes not only integer arithmetic instructions but also the above-mentioned special instructions and read instructions for reading the PRI register, the EXCL register, and the IR register.

The special instructions are executed by the functional unit B in this embodiment, but they may be executed by another functional unit.

FIG. 12 shows the processing of the special instructions and the read instructions performed by the functional unit B. In this figure, "x" indicates the number of a logical processor which has issued the instruction, while "y" indicates the ID of each logical processor other than the issuer logical processor. The functional unit B is notified of the logical processor number from the signal (1BBB to 3BBB shown in FIG. 11) outputted from the prohibition unit 50B.

As shown in the figure, according to an "inc pri" instruction, the functional unit B sets the PRIx[1] bit of the PRI register to "1" in the supervisor mode, and the PRIx[0] bit to "1" in the user mode.

According to a "dec Pri" instruction, the functional unit B sets the PRIx[1] bit to "0" in the supervisor mode, and the PRIx[0] bit to "0" in the user mode.

According to a "halt" instruction, the functional unit B sets the PRIx[2] bit of the PRI register of the logical processor to "1".

According to an "excsv" instruction, the functional unit B sets the EXCLx bit of the EXCL register to "1", and the EXCL bit to "0". For instance, if the logical processor 2 is the issuer of the instruction, the functional unit B sets the EXCL2 bit to "1", and the EXCL3 bit and EXCL1 bits to "0".

According to a "retex" instruction, the functional unit B sets the EXCLx bit to "0".

Even if the same special instruction is to be executed, different bits in the register are used in accordance with the issuer logical processor.

The functional unit B executes each "mov" instruction shown in FIG. 12 as follows.

A "mov PRI, R0" instruction is issued to transfer the content of the PRI register to the R0 register. The functional unit B executes this instruction as follows.

In the MYID field (=PRI[31:29]) of the PRI register, the ID of the logical processor which has issued the instruction is written into each bit of R0[31:29].

PRI[11:3] (=PRI3, PRI2, and PRI1 fields) in the PRI register is read out and transferred to [11:3] in the R0 register.

As for PRI[2:0] (=MYPRI field), a PRIx selected from the PRI3, PRI2, and PRI1 fields corresponding to the ID of the logical processor which has issued the instruction is written into each bit of R0[31:29].

A "mov IR, R0" instruction is issued to transfer the content of the IR register to the R0 register. According to this instruction, the functional unit B writes the ID of the logical processor which has issued the instruction into each bit of R0[31:29] in the MYID field (=IR[31:29]) of the IR register. The value of each bit of IR[2:0] (=IR3, IR2, and IR1 bits) is read out and written into each bit of R0[2:0].

A "mov EXCL,R0" instruction is issued to transfer the content of the EXCL register to the R0 register. The processing of the instruction performed by the functional unit B are the same as of the "mov IR,R0" instruction, except that the transfer destination is the IR register.

By performing the above read instructions, each logical processor can obtain the value of the logical processor ID from the read MYID field and the status (priority, self-halt state, exclusive halt state, or the like) of other logical processors.

[Detailed Structure of the Priority Control Unit 60]

Figure 13:
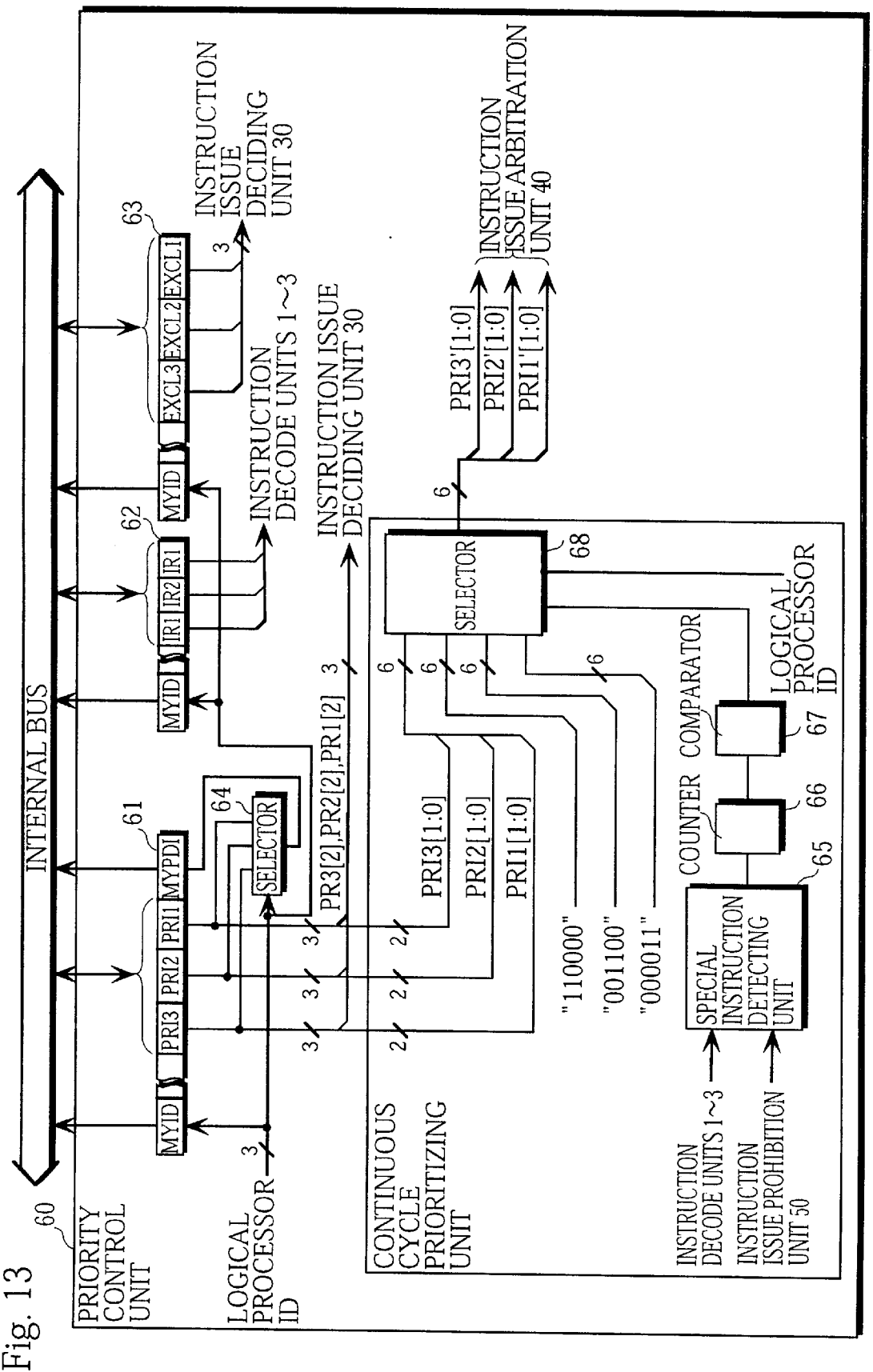
FIG. 13 is a block diagram showing a detailed structure of the priority control unit.

FIG. 13 is a block diagram showing the structure of the priority control unit 60 in detail.

The priority control unit 60 comprises a PRI register 61, an IR register 62, an EXCL register 63, a selector 64, and a continuous cycle prioritizing unit 69.

As the bit configurations of the PRI register 61, the IR register 62, and the EXCL register 63 have already been explained with reference to FIGS. 3, 6, and 7, the following description concerns only the hardware structure.

The registers 61 to 63 are connected to the internal bus of the multithreaded processor, and read and write in the functional unit B are performed via the internal bus.

The higher three bits (MYID field) of these registers 61 to 63 holds no data. Instead, they output the logical processor ID to the internal bus transparently when executing a read instruction. The value of the logical processor ID is notified by way of the signals (1BBB to 3BBB in FIG. 11) outputted from the prohibition unit 50B.

When the PRI register 61 executes a read instruction, the lower three bits of the PRI register 62 output the output of the selector 64 to the internal bus transparently.

The selector 64 selects one field corresponding to the issue logical processor ID from the PRI3, PRI2, and PRI1 fields in the PRI register 61, and outputs it to the internal bus via the MYPRI field in the IR register 62 at the time of the execution of a read instruction by the PRI register 61.

The continuous cycle prioritizing unit 69 can temporarily raise the priority level during a special instruction stream is executed. The special instruction stream needs to be executed in continuous cycles, when reading and writing a resource shared by other logical processors, for instance.

An example special instruction stream is shown below. It should be noted that the instructions are written in mnemonic code. Remarks as to each instruction is provided after ";".

LOOP:
  ; label
aldst MEM[100], R0
  ; also known as "Atomic LoaD STart instruction"
  ; transfer the data of the memory (address 100) to R0
test R0
  ; if R0=0, set the zero flag to "1"
beq LOOP
  ; if the zero flag is 1, branch to the label LOOP
store R1, MEM[100]
  ; transfer the data of the register R1 to the memory address 100

The above special instruction stream reads out the memory address 100, and if the read data is "0", it writes the data of the register R1 into the memory address 100. If the read data is not "0", the special instruction stream orders a loop process for reading repeatedly until it reads out data "0". The special instruction stream needs to be executed in continuous cycles, for instance, when the memory address 100 is used as a shared resource by a plurality of logical processors. That is, during the execution of the special instruction stream by on logical processor, other logical processors are not allowed to rewrite the memory address 100.

If one functional unit has detected the execution start of the first instruction of the special instruction stream, to make sure that the special instruction stream is executed in continuous cycles, the continuous cycle prioritizing unit 69 temporarily changes the priority of the priority control unit 60 so that the priority level of the instruction issuer logical processor (or instruction stream) will be higher than other logical processors during a predetermined number of continuous cycles that continues from the execution cycle of the instruction.

[Continuous Cycle Prioritizing Unit 69]

The continuous cycle prioritizing unit 69 comprises a special instruction detecting unit 65, a counter 66, a comparator 67, and a selector 68.

In this figure, the special instruction detecting unit 65 detects the execution start of the first instruction of a special instruction stream (hereinafter referred to as "the special instruction"). In the above example special instruction stream, the aldst instruction is determined as the special instruction. More specifically, the special instruction detecting unit 65 detects the execution start of the special instruction upon receipt of the notification that the instruction decode units 1 to 3 have decoded the special instruction, and another notification that the instruction issue prohibition unit 50 has issued the special instruction to one of the functional units.

The counter 66 counts the number of cycles required for the execution of the special instruction stream after the execution start of the special instruction has been detected. In the example special instruction stream, three cycles required for the execution of three instructions following the aldst instruction, and therefore, the counter 66 is loaded with an initial value "3" when the execution start is detected, and then decremented to "0". By doing so, the counter will be "0" in the execution cycle of the store R1, MEM[100] instruction. If the special instruction stream requires a loop process, the counter 66 is incremented by one from the initial value "3" every time the aldst instruction is detected.

The comparator 67 judges whether the count value of the counter 66 is "0", that is, whether the special instruction stream should be executed in continuous cycles.

The selector 68 is a 6-bit long, 4-input and 1-output selector and used for temporarily changing the priority during the continuous cycles.

FIG. 14 shows the select signals inputted into the selector 68, and the relationship between the select signals and output values. Although the input values of the selector 68 are not shown in this table, they are "PRI[11:3] (=PRI3[1:0], PRI2[1:0], PRI1[1:0])", "110000", "001100", and "000011", as can be seen from FIG. 13.

Normally, i.e., when not in a continuous cycle period, the selector 68 outputs the priority level designated in PRI[11:3] (=PRI3, PRI2, and PRI1 fields) of the PRI register as shown in FIG. 14.

When in a continuous cycle period (i.e., when the count value is 0), the selector 68 outputs the value of "PRI[11:3] (=PRI3'[1:0], PRI2'[1:0], PRI1'[1:0])", which is "110000" if the instruction issuer is the logical processor 3, "001100" if the instruction issuer is the logical processor 2, and "000011" if the instruction issuer is the logical processor 1.

Thus, the priority of the logical processor which has issued the special instruction is temporarily changed to the highest during the continuous cycle period.

The following description concerns the operation of the multithreaded processor of this embodiment having the structure described above.

Operation in Setting Priority, Self-halt State, and Exclusive Halt State

The multithreaded processor of this embodiment is provided with special instructions including an "incpr" instruction and a "decpr" instruction for setting and changing the priority level of each instruction stream (each logical processor), a "halt" instruction for self-halt, and an "excsv" instruction and a "retex" instruction for exclusive halt. These instructions need to be predetermined in the program that generates the instruction streams.

When a priority level in the program should be raised, for instance, the "incpr" instruction should be issued immediately before the program, while the "decpr" instruction should be issued immediately after the program. The "incpr" and "decpr" instructions set as above are executed by the functional unit B as follows. Depending on which one of the logical processors 1 to 3 has issued the instruction, the functional unit B sets the PRIx[0] bit in the corresponding PRx field of the PRI register to "1" or "0" in the user mode, while it sets the PRIx[1] bit to "1" or "0" in the supervisor mode. By doing so, the priority level of each logical processor can be flexibly changed.

When operating only the present logical processor and halting the remaining logical processors in the program, the "excsv" instruction should be provided immediately before the corresponding part of the program, while the "retex" instruction should be provided immediately after the corresponding part of the program. These instructions are executed by the functional unit B as in the same manner as above.

On the other hand, when halting the present logical processor and giving priority to the remaining logical processors, the "halt" instruction should be provided. This instruction is also executed by the functional unit B. An interrupt request should be suitably inputted into a logical processor in a halt state, because the halt state of the logical processor can be cancelled by an interrupt request. For instance, an internal interrupt between the logical processors is conducted by the IR register. An interrupting logical processor reads out the MYID in advance from the IR register, the PRI register, or the EXCL register, according to a normal register transfer instruction. The logical processor then determines the IRx bit corresponding to the logical processor to be interrupted, and sets an internal interrupt request in the IR register according to a normal transfer instruction.

Overall Operation

In the case where the logical processor 1 is in a self-halt state or in a halt state due to an exclusive halt of another logical processor if an instruction issue request (a request flag and the number of the functional unit B) is outputted to the functional unit B according to the decode result of the instruction decode unit 1, the stop deciding unit 310 in the instruction issue deciding unit 30 nullifies the request flag. Thus, the remaining logical processors 2 and 3 can use the functional units.

In the case where the logical processor 1 is neither in a self-halt state nor in a halt state due to an exclusive halt of another logical processor, the instruction issue request is distributed to the functional unit B by the demultiplexer 320 in the instruction issue deciding unit 30. If the functional unit B is ready to receive an instruction from the logical processor 1, the issue deciding unit 330 judges that the instruction issue request can be issued, while if the functional unit B is not ready to receive an instruction, the issue deciding unit 330 judges that the instruction issue request cannot be issued.

Upon receipt of an instruction issue request of each functional unit from the instruction issue deciding unit 30, the instruction issue arbitration unit 40 determines which logical processor can issue an instruction to each functional unit, depending on the information as to the priority of each logical processor sent from the priority control unit 60. For instance, if an instruction issue request is issued only from the instruction decode unit 1 to the functional unit B (that is, if only 1B is effective among 1B to 3B in FIG. 9), the instruction issue arbitration unit 40 makes only the issued instruction issue request effective (only 1BB is effective among 1BB to 3BB in FIG. 9).

In the case where the instruction decode unit 1 decodes an instruction for the functional unit A, the instruction decode unit 2 decodes an instruction for the functional unit B, the instruction decode unit 3 decodes an instruction for the functional unit C, and all the functional units are ready to receive an instruction, the instruction issue arbitration unit 40 makes all the three instruction requests effective.

In the case where the instruction issue decode unit 1 decodes an instruction for the functional unit A, and the instruction decode unit 2 also decodes an instruction for the functional unit A (that is, where 1A and 2A are effective at the same time in FIG. 9), the priority judging unit 41A judges the priority from the PRI register in the priority control unit 60, and issues the higher priority level instruction first. If the priority levels of the logical processors 1 and 2 are the same, the judgement auxiliary unit 42A makes one of the instruction issue request effective.

In the case where an instruction determined to be issued by the instruction issue arbitration unit 40 needs to be processed urgently by one of the logical processors, the instruction issue prohibition unit 50 prohibits the logical processor from issuing an instruction.

The instruction issue deciding unit 30 and the instruction issue prohibition unit 50 each has the function of excluding an instruction issue request for the reasons described below.

Instructions which can be judged not to be issuable at an early stage are excluded from issuable instructions by the instruction issue deciding unit 30. However, if instructions judged not to be issuable only at a later stage are also excluded by the instruction issue deciding unit 30, the final decision as to whether instruction issuance is possible will be delayed, and the frequency of the processor will be adversely affected.

For instance, if a decision to issue an instruction to the instruction issue prohibition unit is made in one cycle, the instruction should be excluded when the instruction issue deciding unit 30 is informed at a later stage that the instruction cannot be issued. In such a case, the cycle needs to be long, which often impedes an increase in clock frequency. To avoid such a situation, the instruction issue prohibition unit 50 is employed to prohibit issuance of instructions which are judged not to be issuable only at a later stage. If the logical processor as the instruction issue prohibition unit 50 is prohibited from issuing instructions, the same prohibiting instruction cannot be issued from another logical processor, because at this stage, one instruction has already been selected for each of the functional units A to D.

After that, the instruction selecting unit 70 sends instruction contents and operations decoded by the instruction decode units 1 to 3 to the functional units A to D according to instruction issue orders from the instruction issue prohibition unit 50 (1AAA to 3AAA, 1BBB to 3BBB, 1CCC to 3CCC, and 1DDD to 3DDD in FIG. 11).

Although the number of logical processors is 3 and the number of functional units is 4 in this embodiment, these numbers can be changed at will.

The content of the PRI register may be held by a plurality of registers. For instance, each PRIx[2] bit for self-halt and each PRIx[1:0] field for indicating priority level may be included in separate registers. On the other hand, all or two registers among the PRI register, the IR register, and the EXCL register may be included in one register.

The special instruction detecting unit 65 may detect the execution start of the special instruction upon receipt of a notification from the functional unit that has started the execution of the special instruction.

Although the present invention is applied to competition among a plurality of logical processors for the functional units in this embodiment, it may also be applied to a resource shared by a plurality of logical processors. The following is an explanation of such a case as another embodiment.

Another Embodiment

The priority levels of a plurality of logical processors can be used for arbitration among the logical processors accessing a shared resource, and an example of such a case is described below.

Figure 15:
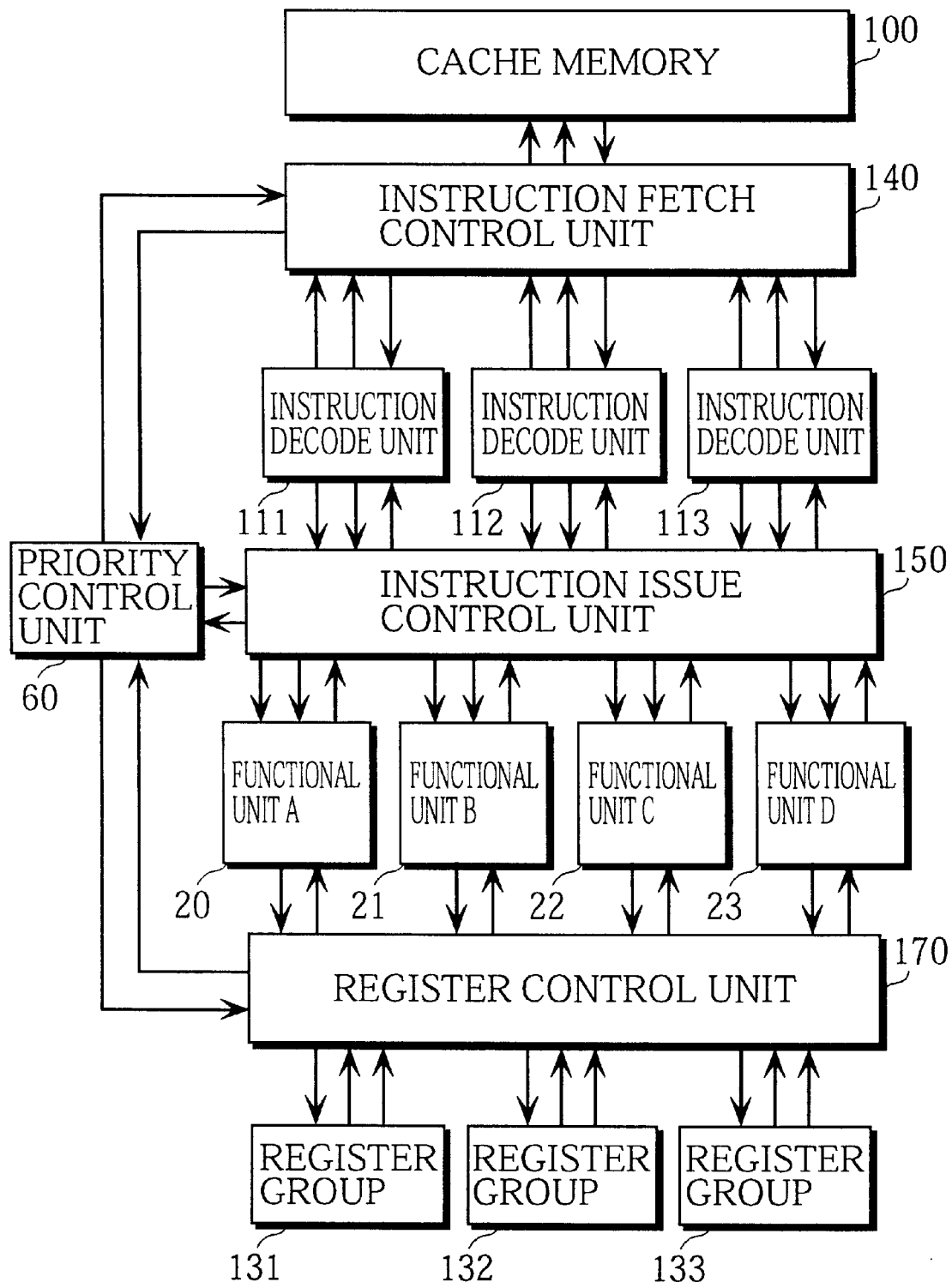
FIG. 15 is a block diagram showing a multithreaded processor of another embodiment of the present invention.

FIG. 15 is a block diagram showing the structure of the multithreaded processor of another embodiment of the present invention.

This multithreaded processor comprises a cache memory 100, instruction decode units 111 to 113, registers 131 to 133, an instruction fetch control unit 140, an instruction issue control unit 150, a priority control unit 60, functional units A20 to D23, and a register control unit 170. The components having the same numbers as in FIG. 2 are the same in the first embodiment, and therefore, the following description mainly concerns different aspects.

In FIG. 15, the cache memory 100 is used for a program which generates instruction streams.

The instruction decode units 111 to 113 are the same as the instruction decode units 1 to 3 shown in FIG. 2, except that they are controlled by the instruction fetch control unit 140.

The registers 131 to 133 are register files each consisting of a plurality of registers corresponding to the instruction decode units 111 to 113, respectively. Thus, they also correspond to the logical processors 1 to 3.

The instruction fetch control unit 140 has the same functions as the instruction issue arbitration unit 40 and the instruction issue prohibition unit 56 shown in FIG. 2, except that the competition among instruction fetch requests, instead of instruction issue requests, is arbitrated. In the case where the fetching order is determined according to the priority, or where the operation of a predetermined logical processor is stopped when the priority designation of each logical processor is inputted from the priority control unit 60, and a plurality of instruction decode units simultaneously issue instruction fetch requests to the cache memory 100, instruction fetching from the instruction decode unit of the predetermined logical processor will be stopped.

The instruction issue control unit 150 has the same function as the combined functions of the instruction issue deciding unit 30, the instruction issue arbitration unit 40, the instruction issue prohibition unit 50, and the instruction selecting unit 70, and therefore, no explanation of it is not provided here.

The register control unit 170 has the same function as the combined functions of the instruction issue deciding unit 30 and the instruction issue arbitration unit 40, except that the competition among register access requests, instead of instruction issue requests, is arbitrated. In the case where the priority designation of each logical processor is inputted from the priority control unit 60, and a plurality of functional units simultaneously output requests for data write, the register control unit 170 determines the write order in accordance with the priority level.

With the above structure, not only the competition among the logical processors for one functional unit, but also the competition among instruction fetch requests for the cache memory and the competition among data access requests for one register group can be arbitrated or stopped in accordance with the priority level.

Although the number of instruction streams and logical processor and the number of functional units are 4 in the above description, the numbers are not limited to 4.

The number of priority levels is 3 (2 bits) in the above description, but it is not limited to that. The control register is 32-bit long, but it may be shorter or longer than that.

If branches occur simultaneously in a plurality of logical processors which share the same resource or cache for address calculation, the competition among them can be arbitrated in accordance with the priority level as in other embodiments.

Although the PRI register changes the priority levels according to special instructions, the hardware may also set and change priority levels. In such a case, depending on the timing in setting of the priority level of each instruction stream and the state of each instruction stream under supervision, a change in the priority is triggered by external or internal factors of the hardware.

In the above embodiment, two or three instructions having the same priority level are made all effective and outputted from the priority judging unit 41A as shown in FIG. 9, but only one instruction may be made effective and outputted. In such a case, the judgement auxiliary unit 42A is not necessary.

Although the judgement auxiliary unit 42A is provided after the priority judging unit 41A in FIG. 9, it may be disposed between the priority control unit 60 and the priority judging unit 41A so that the priority can be flexibly changed when two or more instruction streams have the same priority level.

In the above embodiment, the MYPRI field in the PRI register outputs the priority level of the issuer of a read instruction for the PRI register. Likewise, a MYDATA filed may be provided for outputting the data of each logical processor (status data, error information, and the like).

An urgent process detected by the prohibition unit 50A may be an event or an exceptional process. The event may be an external interrupt or an internal interrupt. The exceptional process may be a cache miss, an access exception such as a memory access error, a trap instruction, an arithmetic exception, or an arithmetic error.

In the above embodiments, each instruction decode unit decodes one instruction, and one instruction is issued at a time. However, an instruction decode unit may decode a plurality of instructions in one instruction stream, and also issue a plurality of instructions.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A multithreaded processor for executing multiple instruction streams, each of said multiple instruction streams may contain a special instruction to change a priority level of the corresponding instruction stream, the multithreaded processor comprising, a plurality of functional units for respectively executing an instruction;

a plurality of instruction decode means, corresponding to the multiple instruction streams on a one-to-one basis, for respectively decoding an instruction, and producing an instruction issue request for designating to which functional unit the decoded instruction should be issued and requesting for the issuance of the decoded instruction to the designated functional unit;

holding means for holding the priority level of each of the instruction streams, wherein each priority level is independent of the priority levels of the other instruction streams; and control means for deciding which decoded instruction should be issued to a functional unit designated by two or more instruction request at the same time, in accordance with the priority levels stored by the holding means;

wherein one of the functional units receives the special instruction from one of the instruction streams for individually and independently changing the priority level of the corresponding instruction stream in the holding means.

2. A multithreaded processor according to claim 1, wherein the holding means hold flags for indicating whether each instruction stream should be halted or executed, wherein one of the functional units receives an instruction from one of the instruction streams for changing a flag corresponding to the instruction stream, and the control means includes arbitration means for making the decision; and stop means for stopping an instruction stream corresponding to a flag indicating a halt by excluding the instruction issue request of the instruction stream in making the decision.

3. A multithreaded processor according to claim 2, wherein the control means further includes:

prohibition means for temporarily prohibiting issuance of the instruction decided to be issued by the control means to the functional unit, if there is a process which needs to be performed urgently in an instruction stream to which the instruction belongs.

4. A multithreaded processor according to claim 3, wherein the process to be performed urgently is an interrupt request or a cache miss occurrence notification.

5. A multithreaded processor according to claim 1, wherein the special instruction is made up of only an operation code for indicating whether the priority levels should be raised or lowered, and one of the functional units detects which instruction decode means has issued the special instruction in the case where a decode result of the special instruction is issued, and then raises or lowers the priority level of an instruction stream corresponding to the detected instruction decode means.

6. A multithreaded processor according to claim 5, wherein the holding means includes a control register which has a first field for read only, and one of the functional units detects which instruction decode means has issued a read instruction when the decode result of the read instruction of the control register is issued, and outputs the ID of the instruction stream corresponding to the detected instruction decode stream as the read data of the first field to an internal bus.

7. A multithreaded processor according to claim 6, wherein the control register includes priority fields for holding the priority level of each of the instruction streams, and one of the functional units reads out each of the priority fields when the decode result of the read instruction of the control register is issued.

8. A multithreaded processor according to claim 5, wherein the holding means has a control register, the control register includes individual fields corresponding to the multiple instruction streams on a one-to-one basis for holding inherent priority levels of the multiple instruction streams, and a second field for read only, and one of the functional units reads out the individual field of each of the multiple instruction streams upon execution of a read instruction of the control register, and outputs the inherent priority levels of the instruction stream corresponding to the instruction decode means that has issued the read instruction as the read data of the second field to the internal bus.

9. A multithreaded processor according to claim 5, wherein the holding means includes priority fields for holding the priority level of each instruction stream, the priority field of each instruction stream is made up of minor fields indicating the priority level of each instruction stream in each execution mode, one of the functional units detects which instruction decode means has issued the special instruction in the case where the decode result of the special instruction is issued, and then raises or lowers the priority level of each minor field for the current execution mode among the priority fields of the instruction stream corresponding to the detected instruction decode means.

10. A multithreaded processor according to claim 1, further comprising:

specified instruction detecting means for detecting that one of the functional units has started executing a specified instruction, and which instruction decode means has issued the decode result of the specified instruction; and temporary modification means for temporarily modifying, if the specified instruction detecting means has detected the execution start of a specified instruction, the priority level of the instruction stream corresponding to the instruction decode means which has issued the specified instruction over a predetermined period of time, the priority level being modified so as to be higher than the priority levels of other instruction streams.

11. A multithreaded processor for executing multiple instruction streams, each of said multiple instruction streams may contain a special instruction to change a priority level of the corresponding instruction stream, the multithreaded processor comprising, a plurality of functional units for respectively executing instructions;

a plurality of instruction decode means, corresponding to the multiple instruction streams on a one-to-one basis, for respectively decoding an instruction, and producing an instruction issue request for designating to which functional unit the decoded instruction should be issued and requesting for the issuance of the decoded instruction to the designated functional unit;

priority holding means for holding the priority level of each instruction stream, wherein the priority level of each instruction stream is independent of the priority levels of the other instruction streams;

self-halt data holding means for holding self-halt data indicating whether to put each instruction stream into an execution state or a halt state;

arbitration means for determining, upon receipt of instruction issue request sent from the plurality of instruction decode means, which decoded instruction should be issued to the functional unit designated by two or more instruction issue request at the same time, in accordance with the priority levels held by the priority holding means; and stop means for stopping notification to the arbitration means of an instruction issue request from the instruction decode means corresponding to the instruction stream kept in a the halt state by the self hold data, the instruction issue request being one of the instruction issue request sent from the plurality of instruction decode means to the arbitration means;

wherein one of the functional units receives the special instruction from one of the instruction streams for individually and independently changing the priority level of the corresponding instruction stream in the priority holding means.

12. A multithreaded processor according to claim 11, further comprising exclusive halt data holding means for holding exclusive halt data for each instruction stream, the exclusive halt data indicating that one instruction stream should be in an execution state, and that the remaining instruction streams should be in a halt state, and wherein the stop means stops notifying the arbitration means of the issuance of an instruction issue request from the instruction decode means corresponding to instruction streams kept in a halt state by the exclusive halt data.

13. A multithreaded processor according to claim 11, wherein the special instruction is made up of only an operation code for indicating whether the priority levels should be raised or lowered, and one of the functional units detects which instruction decode means has issued the special instruction in the case where a decode result of the special instruction is issued, and then raises or lowers the priority level of an instruction stream corresponding to the detected instruction decode means.

14. A multithreaded processor according to claim 13, wherein the holding means includes a control register which has a first field for read only, and one of the functional units detects which instruction decode means has issued a read instruction when the decode result of the read instruction of the control register is issued, and outputs the ID of the instruction stream corresponding to the detected instruction decode stream as the read data of the first field to an internal bus.

15. A multithreaded processor according to claim 14, wherein the control register includes priority fields for holding the priority level of each of the instruction streams, and one of the functional units reads out each of the priority fields when the decode result of the read instruction of the control register is issued.

16. A multithreaded processor according to claim 11, wherein the holding means has a control register, the control register includes individual fields corresponding to the multiple instruction streams on a one-to-one basis for holding inherent priority levels of the multiple instruction streams, and a second field for read only, and one of the functional units reads out the individual field of each of the multiple instruction streams upon execution of a read instruction of the control register, and outputs the inherent priority levels of the instruction stream corresponding to the instruction decode means that has issued the read instruction as the read data of the second field to the internal bus.

17. A multithreaded processor according to claim 13, wherein the holding means includes priority fields for holding the priority level of each instruction stream, the priority field of each instruction stream is made up of minor fields indicating the priority level of each instruction stream in each execution mode, one of the functional units detects which instruction decode means has issued the special instruction in the case where the decode result of the special instruction is issued, and then raises or lowers the priority level of each minor field for the current execution mode among the priority fields of the instruction stream corresponding to the detected instruction decode means.

18. A multithreaded processor according to claim 11, wherein specified instruction detecting means for detecting that one of the functional units has started executing a specified instruction, and which instruction decode means has issued the decode result of the specified instruction, and temporary modification means for temporarily modifying, if the specified instruction detecting means has detected the execution start of a specified instruction, the priority level of the instruction stream corresponding to the instruction decode means which has issued the specified instruction over a predetermined period of time, the priority level being modified so as to be higher than the priority levels of other instruction streams.

19. A multithreaded processor for executing multiple instruction streams simultaneously and independently of each other, each of said multiple instruction streams may contain a special instruction to change a priority level of the corresponding instruction stream, the multithreaded processor comprising, a plurality of functional units for executing instructions simultaneously and independently of each other;

a plurality of instruction decode means, corresponding to the multiple instruction streams on a one-to-one basis, for respectively fetching and decoding an instruction of each instruction stream, and specifying to which functional unit the instruction should be issued;

priority designating means for designating the priority level of each of the multiple instruction streams, wherein each priority level is independent of the priority levels of the other instruction streams;

instruction issue judging means for judging whether the decoded instruction can be issued to the specified functional unit, depending upon whether the specified functional unit is ready to receive an instruction; and instruction issue arbitration means for arbitrating between two or more instructions to determine one instruction to be issued to the functional unit specified by the two or more instruction decode means, in accordance with the priority levels designated by the priority designating means;

wherein one of the functional units receives the special instruction from one of the instruction streams for individually and independently changing the priority level of the corresponding instruction stream designated by the priority designation means.

20. A multithreaded processor according to claim 19, further comprising instruction issue prohibition means for temporarily prohibiting issuance of the instruction decided to be issued by the control means to the functional unit, if there is a process which needs to be performed urgently in an instruction stream to which the instruction belongs.

21. A multithreaded processor according to claim 20, wherein the process to be performed urgently is an interrupt request or a cache miss occurrence notification.

22. A multithreaded processor according to claim 20, wherein the priority designating means includes a control register for holding the priority level of each instruction stream, the priority level being able to be set by an instruction in each instruction stream.

23. A multithreaded processor according to claim 22, wherein the instruction issue arbitration means determines which instruction should be issued to a functional unit according a predetermined procedure, the functional unit being able to be set by two or more instructions, and the instruction streams to which the instructions belong have the same priority level.

24. A multithreaded processor according to claim 23, wherein the instruction issue arbitration means includes auxiliary judgement means for determining which instruction should be issued according to the predetermined procedure, in which a different instruction stream is selected in cycles, an instruction of an instruction stream different from the previous one is selected, or an instruction of one of the instruction streams is invariably selected.

25. A multithreaded processor according to claim 22, wherein the control register includes a priority field for each instruction stream in each execution mode, and the instruction issue arbitration means arbitrates with reference to priority fields corresponding to the execution modes for the multiple instruction streams.

26. A multithreaded processor according to claim 20, wherein the priority designating means comprises a control register including priority fields which can be set for each instruction stream in each execution mode by a special instruction in an instruction stream, and one of the functional units detects the instruction stream and its execution mode corresponding to the instruction decode means that has issued the special instruction, and sets the priority level into the priority field corresponding to the detected instruction stream and execution mode, in accordance with the special instruction.

27. A multithreaded processor according to claim 26, wherein the special instruction is made up of only an operation code, and indicates whether the priority level should be raised or lowered.

28. A multithreaded processor for executing multiple instruction streams simultaneously and independently of each other, each of said multiple instruction streams may contain a special instruction to change a priority level of the corresponding instruction stream, the multithreaded processor comprising, a plurality of functional units for executing instructions simultaneously and independently of each other;

a plurality of instruction decode means, corresponding to the multiple instruction streams on a one-to-one basis, for respectively fetching and decoding an instruction of each instruction stream, and specifying to which functional unit the instruction should be issued;

priority designating means for designating the priority level of each of the multiple instruction streams, and designating whether each instruction stream should be in an execution state or a in halt state, wherein each priority level is independent of the priority levels of the other instruction streams;

instruction issue judging means for judging whether the decoded instruction can be issued to the specified functional unit, depending upon whether the specified functional unit is ready to receive an instruction; and instruction issue arbitration means for arbitrating between two or more instructions to determine one instruction to be issued to the functional unit specified by the two or more instruction decode means, in accordance with the priority levels designated by the priority designating means;

wherein one of the functional units receives the special instruction from one of the instruction streams for individually and independently changing the priority level of the corresponding instruction stream designated by the priority designation means.

29. A multithreaded processor according to claim 28, wherein the priority designating means comprises:

a first register for holding the priority level of each instruction stream that can be set by a first instruction;

a second register for holding a status flag of each instruction stream indicating whether each instruction stream is in an execution state or in a halt state, the status flag being set by a second instruction; and a third register for holding an exclusive halt flag of each instruction stream which orders to halt other instruction streams, the exclusive halt flag being set by a third instruction, and the instruction issue judging means judges that the instructions in the halted instruction streams cannot be issued, in accordance with the status flag and the exclusive halt flag.

30. A multithreaded processor according to claim 29, wherein the first instruction is made up of only an operation code for indicating whether the priority level should be raised or lowered, the second instruction is made up of only an operation code for indicating whether the status flag should indicate the halt state or the execution state, the third instruction is made up of only an operation code for indicating that other instruction streams should be halted, and one of the functional units detects the instruction stream corresponding to the instruction decode means that have issued the first, second, and third instructions, and changes the priority level, the status flag, and the exclusive flag corresponding to the detected instruction stream.

31. A multithreaded processor for executing multiple instruction streams simultaneously and independently of each other, each of said multiple instruction streams may contain a special instruction to change a priority level of the corresponding instruction stream, the multithreaded processor comprising, a plurality of instruction cache means for temporarily storing instructions of the multiple instruction streams;

a plurality of instruction fetch means, corresponding to the multiple instruction streams on a one-to-one basis, for respectively fetching an instruction of each instruction stream from the instruction cache means;

priority designating means for designating the priority level of each of the multiple instruction streams, wherein the priority level of each instruction stream is independent of the priority levels of the other instruction streams; and instruction fetch control means for arbitrating between instruction fetch request issued by two or more instruction cache means, in accordance with the priority levels designated by the priority designation means;

wherein one of the functional units receives the special instruction from one of the instruction streams for individually and independently changing the priority level of the corresponding instruction stream designated by the priority designation means.

32. A multithreaded processor for executing multiple instruction streams, each of said multiple instruction streams may contain a special instruction to change a priority level of the corresponding instruction stream, the multithreaded processor provided with a plurality of functional units for executing instructions, a plurality of instruction decode means for respectively decoding an instruction fetched from an instruction cache means and outputting an instruction issue request to a designated functional unit, and the same number of register sets as the instruction decode means, which executes the same number of instruction streams as the instruction decode means simultaneously and independently of each other, the multithreaded processor comprising:

holding means for holding the priority levels of each instruction stream that can be set by an instruction in each instruction stream, wherein the priority level of each instruction stream is independent of the priority levels of the other instruction streams; and control means for arbitrating between two or more instruction streams sharing the same resource, in accordance with the priority levels, the shared resource being one functional unit for which instruction issue request from two or more instruction decode means compete, one instruction cache for which fetch request from two or more instruction decode means compete, or one register set for which access request from two or more functional units competes;

wherein one of the functional units receives the special instruction from one of the instruction streams for individually and independently changing the priority level of the corresponding instruction stream designated by the priority designation means.

33. A multithreaded processor according to claim 32, wherein the special instruction is an instruction for indicating whether the priority level should be raised or lowered.

34. A multithreaded processor for executing multiple instruction streams, each of said multiple instruction streams may contain a special instruction to change a priority level of the corresponding instruction stream, the multithreaded processor comprising:

a plurality of functional units for respectfully executing instructions;

a plurality of instruction decode means, corresponding to the multiple instruction streams on a one-to-one basis, wherein each instruction decode means decodes an instruction, produces an instruction issue request for designating to which functional unit the decoded instruction should be issued, and request an issuance of the decoded instruction to the designated functional unit;

holding means for holding the priority level of each of the instruction streams, wherein each priority level is independent of the priority levels of the other instruction streams;

control means for deciding which decoded instruction should be issued to a functional unit simultaneously designated by at least two instruction issue request, in accordance with the priority levels stored by the holding means; and changing means for individually and independently changing the priority level of an instruction stream held by the holding means according to the special instruction in the instruction stream to change the priority level.

35. A multithreaded processor according to claim 1, wherein the control means determines which instruction should be issued to a functional unit according to a predetermined procedure, the functional unit being able to be set by two or more instructions, and the instruction streams to which the instruction belong have the same priority level.

36. A multithreaded processor according to claim 35, wherein the predetermined procedure is one of a procedure in which an instruction in a different instruction stream is cyclically determined to be issued, a procedure in which an instruction in an instruction stream different from an instruction stream of a previously issued instruction is determined to be issued according to a history of instruction stream execution, and a procedure in which an instruction in an instruction stream is fixedly determined to be issued.

37. A multithreaded processor according to claim 1, wherein the control means determines which decoded instruction should be issued to a functional unit according to a predetermined procedure when instructions designated by two or more instruction request at the same time belong to instruction streams having the same priority level.

38. A multithreaded processor according to claim 37 wherein the procedure is one in which the control means selects a different instruction to be issued every cycle or every few cycles from among the instructions belonging to the instruction streams having the same priority level.

* * * * *